(12) United States Patent
Osuala et al.

(10) Patent No.: US 12,099,533 B2
(45) Date of Patent: Sep. 24, 2024

(54) SEARCHING A DATA SOURCE USING EMBEDDINGS OF A VECTOR SPACE

(71) Applicant: International Business Machines Corporation, Armonk, NY (US)

(72) Inventors: Richard Obinna Osuala, Munich (DE); Dominik Moritz Stein, Oberding (DE); Andrea Giovannini, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/934,590

(22) Filed: Sep. 23, 2022

(65) Prior Publication Data

US 2024/0111794 A1    Apr. 4, 2024

(51) Int. Cl.
  *G06F 16/30*   (2019.01)
  *G06F 16/33*   (2019.01)
  *G06F 16/332*  (2019.01)
  *G06F 40/284*  (2020.01)

(52) U.S. Cl.
  CPC ...... *G06F 16/3323* (2019.01); *G06F 16/3338* (2019.01); *G06F 16/3347* (2019.01); *G06F 40/284* (2020.01)

(58) Field of Classification Search
  CPC ............ G06F 16/3323; G06F 16/3338; G06F 16/3347; G06F 40/284
  See application file for complete search history.

(56) References Cited

U.S. PATENT DOCUMENTS

| | | | |
|---|---|---|---|
| 7,752,204 B2 | 7/2010 | Kao | |
| 7,831,585 B2* | 11/2010 | Ramsey | G06Q 30/02 705/14.1 |
| 9,454,581 B1* | 9/2016 | Garg | H04L 67/306 |
| 11,030,414 B2 | 6/2021 | Peters | |
| 11,520,815 B1* | 12/2022 | Gutta | G06F 16/3344 |

(Continued)

FOREIGN PATENT DOCUMENTS

CN    112507219 A  *  3/2021  ......... G06F 16/9535

OTHER PUBLICATIONS

Machine Translation of CN 112507219 A, dated 2021 (Year: 2021).*

(Continued)

*Primary Examiner* — Mahesh H Dwivedi
(74) *Attorney, Agent, or Firm* — KONRAD, RAYNES, DAVDA & VICTOR LLP; Janaki K. Davda

(57) ABSTRACT

In several aspects for querying a data source represented by data object embeddings in a vector space, a processor inputs, to a trained embedding generation model, a received query and at least one token for receiving from the trained embedding generation model a set of embeddings of the vector space. The set of embeddings comprises an embedding of the received query and at least one embedding of the at least one token respectively, wherein the embedding of each token is a prediction of an embedding of a supplement of the query. The data object embeddings may be searched for data object embeddings that match the set of embeddings. This may result in search result embeddings of the set of embeddings. Data objects that are represented by the search result embeddings may be determined. At least part of the determined data objects may be provided.

20 Claims, 16 Drawing Sheets

(56) References Cited

U.S. PATENT DOCUMENTS

| | | | | |
|---|---|---|---|---|
| 2006/0026013 | A1* | 2/2006 | Kraft | G06Q 10/10 |
| | | | | 707/E17.109 |
| 2014/0379708 | A1* | 12/2014 | Fox | G06Q 30/06 |
| | | | | 707/728 |
| 2015/0046492 | A1* | 2/2015 | Balachandran | G06F 8/36 |
| | | | | 707/772 |
| 2018/0032620 | A1* | 2/2018 | Kasravi | G06F 16/9535 |
| 2018/0365220 | A1* | 12/2018 | Chakraborty | G06F 40/30 |
| 2018/0365321 | A1* | 12/2018 | Ke | G06F 40/284 |
| 2019/0251595 | A1 | 8/2019 | Ordentlich | |
| 2020/0134038 | A1 | 4/2020 | Chandra Sekar Rao | |
| 2020/0251100 | A1* | 8/2020 | Tan | G06N 3/08 |
| 2020/0311165 | A1* | 10/2020 | Shukl | G06F 16/9537 |
| 2021/0248376 | A1* | 8/2021 | Zhao | G06V 20/49 |
| 2021/0374352 | A1 | 12/2021 | Li | |
| 2023/0034450 | A1* | 2/2023 | Sridhar | G10L 15/1822 |
| 2023/0316373 | A1* | 10/2023 | Xu | G06Q 30/0641 |
| | | | | 705/26.7 |

OTHER PUBLICATIONS

Article entitled "Context Attentive Document Ranking and Query Suggestion", by Ahmad et al., dated Jul. 25, 2019 (Year: 2019).*
Baheti, Pragati, "The Essential Guide to Neural Network Architectures", V7Labs, Jul. 19, 2022, 19 Pages.
Baxter, Jonathan, "A Bayesian/Information Theoretic Model of Learning to Learn via Multiple Task Sampling", Machine Learning, vol. 28, 1997, 33 Pages.
Baxter, Jonathan, "A Model of Inductive Bias Learning", Journal of Artificial Intelligence Research, vol. 12, 2000, 50 Pages.
Brownlee, Jason, "How to Develop a Word-Level Neural Language Model and Use it to Generate Text", Machine Learning Mastery, Deep Learning for Natural Language Processing, Nov. 10, 2017, 27 Pages.
Cer et al., "Universal Sentence Encoder", arXiv:1803.11175v2 [cs.CL], Apr. 12, 2018, 7 Pages.
Chen et al., "Multi-Task Learning in Natural Language Processing: An Overview", arXiv:2109.09138v1 [cs.AI], Sep. 19, 2021, 30 Pages.
Cheng et al., "Open-Domain Name Error Detection using a Multi-Task RNN", Proceedings of the 2015 Conference on Empirical Methods in Natural Language Processing, Lisbon, Portugal, Sep. 17-21, 2015, 10 Pages.
Cheng, Raymond, "Implementing Transformer for Language Modeling", Towards Data Science, Sep. 21, 2020, 8 Pages.
Crawshaw, Michael, "Multi-Task Learning with Deep Neural Networks: A Survey", arXiv:2009.09796v1 [cs.LG], Sep. 10, 2020, 43 Pages.
De Wynter, Adrian, "How to construct the optimal neural architecture for your machine learning task", Machine Learning, Amazon Science, Sep. 23, 2019, 8 Pages.
Devlin et al., "BERT: Pre-training of Deep Bidirectional Transformers for Language Understanding", arXiv: 1810.04805v2 [cs.CL], May 24, 2019, 16 Pages.
Dong et al., "A Semi-supervised Multi-task Learning Approach to Classify Customer Contact Intents", arXiv:2106.07381v1 [cs.IR], Jun. 10, 2021, 9 Pages.
Fairseq, "Fairseq Documentation", Facebook AI Research, Accessed on Sep. 14, 2022, 2 Pages.
Gal et al., "An Image is Worth One Word: Personalizing Text-to-Image Generation using Textual Inversion", arXiv:2208.01618v1 [cs.CV], Aug. 2, 2022, 26 Pages.
Lewis et al., "BART: Denoising Sequence-to-Sequence Pre-training for Natural Language Generation, Translation, and Comprehension", arXiv: 1910.13461v1 [cs.CL], Oct. 29, 2019, 10 Pages.
Liu et al., "Multi-Task Deep Neural Networks for Natural Language Understanding", arXiv:1901.11504v2 [cs.CL], May 30, 2019, 10 Pages.
Liu et al., "ROBERTa: A Robustly Optimized BERT Pretraining Approach", arXiv: 1907.11692v1 [cs.CL], Jul. 16, 2019, 13 Pages.
Liu et al., "What comes next? Extractive summarization by next-sentence prediction", arXiv: 1901.03859v1 [cs.CL], Jan. 12, 2019, 10 Pages.
Liu, Yang, "Fine-tune BERT for Extractive Summarization", arXiv: 1903.10318v2 [cs.CL], Sep. 5, 2019, 6 Pages.
Meij et al., "Method and System for Learning Latent Features for Query Intent Classification", An IP.com Prior Art Database Technical Disclosure, IP.com No. IPCOM000256976D, IP.com Electronic Publication Date: Jan. 10, 2019, 3 Pages.
Niwa et al., "Nearest Neighbor Non-autoregressive Text Generation", arXiv:2208.12496v1 [cs.CL], Aug. 26, 2022, 13 Pages.
Pilault et al., "Conditionally Adaptive Multi-Task Learning: Improving Transfer Learning in NLP Using Fewer Parameters & Less Data", arXiv:2009.09139v3 [cs.LG], Apr. 21, 2022, 22 Pages.
Rei, Marek, "Semi-supervised Multitask Learning for Sequence Labeling", arXiv:1704.07156v1 [cs.CL], Apr. 24, 2017, 10 Pages.
Reimers et al., "Sentence-BERT: Sentence Embeddings using Siamese BERT-Networks", arXiv: 1908.10084v1 [cs.CL], Aug. 27, 2019, 11 Pages.
Ruder, Sebastian, "An Overview of Multi-Task Learning in Deep Neural Networks", arXiv:1706.05098v1 [cs.LG], Jun. 15, 2017, 14 Pages.
Shastri, Akash, "3 neural network architectures you need to know for NLP!", Towards Data Science, Nov. 24, 2020, 7 Pages.
Vig et al., "Exploring Neural Models for Query-Focused Summarization", arXiv:2112.07637v3 [cs.CL], Apr. 26, 2022, 14 Pages.
Xu et al., "Text Summarization with Latent Queries", arXiv:2106.00104v1 [cs.CL], May 31, 2021, 12 Pages.
Yu et al., "Learning Sentence Embeddings with Auxiliary Tasks for Cross-Domain Sentiment Classification", Proceedings of the 2016 Conference on Empirical Methods in Natural Language Processing, Association for Computational Linguistics, Nov. 2016, 11 Pages.
Zhong et al., "Extractive Summarization as Text Matching", arXiv:2004.08795v1 [cs.CL], Apr. 19, 2020, 12 Pages.
"Locality-sensitive hashing," Wikipedia, 10 pp., [online][retrieved Sep. 6, 2023] https://en.wikipedia.org/wiki/Locality-sensitive_hashing.
"Spotify/Annoy," GitHub, 14 pp., [online][retrieved Sep. 6, 2023] https://github.com/spotify/annoy.

* cited by examiner

SEARCHING A DATA SOURCE USING EMBEDDINGS OF A VECTOR SPACE

BACKGROUND

The present invention relates to the field of digital computer systems and more specifically to searching a data source using embeddings of vector space.

Currently a user enters a query into a search box and retrieves a ranked list of search results. Then, the user will manually discover knowledge by clicking through the results searching for the bits and pieces of interest. This process may repeat for multiple consecutive search queries. However, this may be a tedious process that makes up a large fraction of daily activities in many job roles and companies.

SUMMARY

Various embodiments provide a method, computer program product, and computer system for searching a data source as described by the subject matter of the independent claims. Advantageous embodiments are described in the dependent claims. Embodiments of the present invention can be freely combined with each other if they are not mutually exclusive.

In one aspect, the invention relates to a method for querying a data source represented by data object embeddings in a vector space. The method comprises: receiving a query comprising a data object; inputting, to a trained embedding generation model, the received query and at least one token for receiving from the trained embedding generation model a set of embeddings of the vector space, the set of embeddings comprising an embedding of the received query and at least one embedding of the at least one token respectively, wherein the embedding of each token of the at least one token is a prediction of an embedding of a supplement of the query; searching, in the data object embeddings, data object embeddings that match the set of embeddings, resulting in data object embedding, referred to as search result embeddings, of the set of embeddings; determining data objects which are represented by the search result embeddings; and providing at least part of the data objects.

In another aspect the invention relates to a computer program product comprising a computer-readable storage medium having computer-readable program code embodied therewith, the computer-readable program code configured to implement the method of the above embodiment.

In yet another aspect the invention relates to a computer system for querying a data source represented by data object embeddings in a vector space. The computer system is configured to implement the method of the above embodiment.

BRIEF DESCRIPTION OF THE DRAWINGS

In the following embodiments of the invention are explained in greater detail, by way of example only, making reference to the drawings in which.

DETAILED DESCRIPTION

Figure 1:
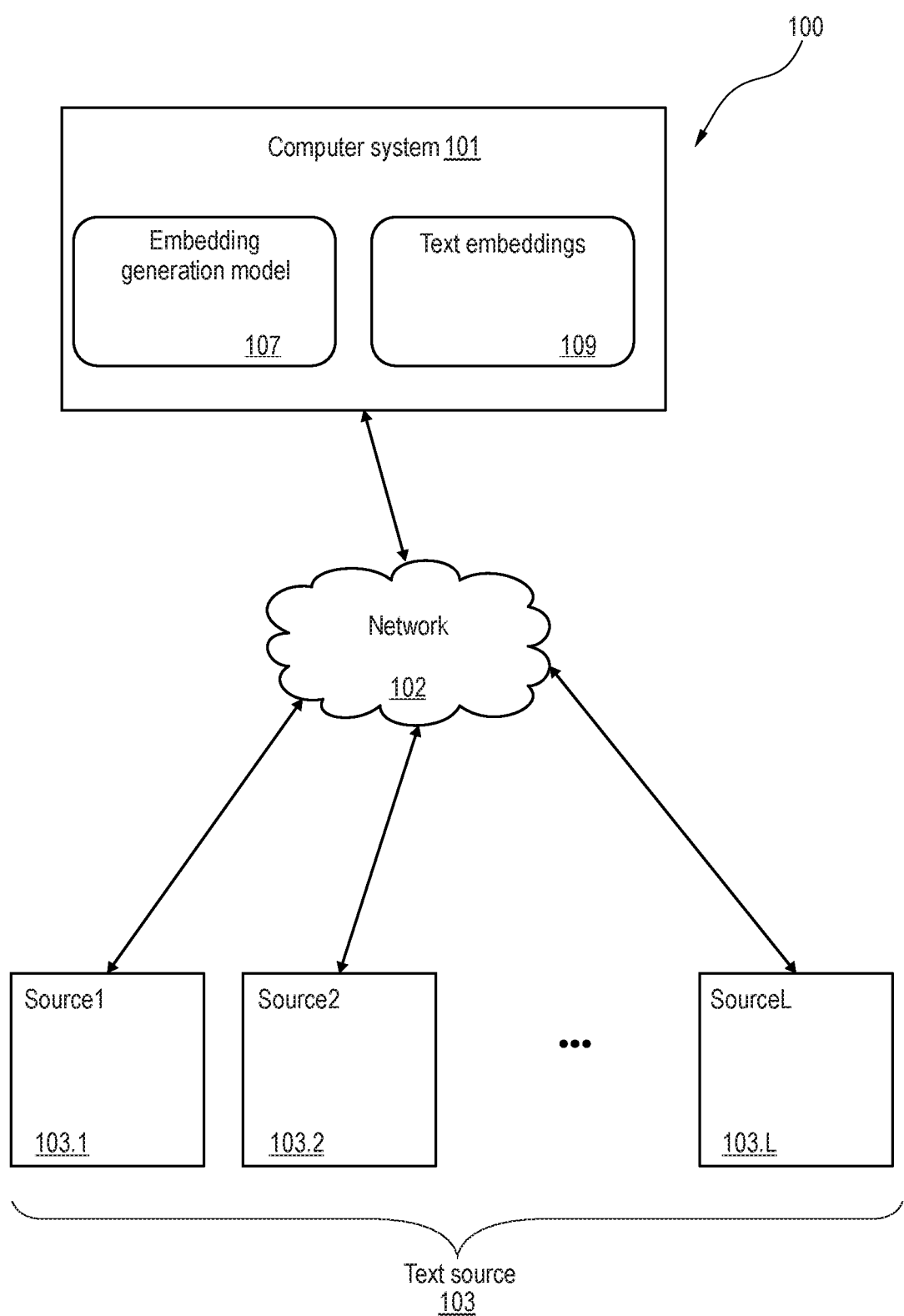
FIG. 1 illustrates a diagram of an information retrieval system in accordance with an embodiment of the present invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may make use of the rich algebraic structure of a vector space for information retrieval and information generation. In particular, the base of the vector space may be defined by all the concepts and instances included in a specific ontology. This may enable an accurate retrieval of information from a data source having data objects representing said specific ontology. The term "data object" is broadly defined as an item that can be represented in an electronic format such that the electronic format can be manipulated by a computer as described herein. The data object may, for example, comprise text and/or image data and/or sound data and/or programming code and/or video data and/or tabular data and/or time-series data. A query comprising a sound may, for example, indicate a spoken question. A query comprising a programming command may, for example, be a SQL command. A query comprising an image may, for example, be a request of the identification/recognition of an object in the image. If the data object is text, the data object embedding is referred to as text embedding; if the data object is an image, the data object embedding is referred to as image embedding; etc.

The embedding representing a data object in the vector space may provide a model-specific numeric representation of (semantic) information of the data object. The embedding may, for example, be a vector of numbers. In the following, the data object is text; however, it will be apparent to the person skilled in the art how to implement the subject described with reference to text for another type of data objects such as images, sounds, etc. The data source may, for example, comprise a text source. The text source may comprise different document sources such as a source of books, a source of emails, source of articles, etc. The term "text" may refer to a sequence of one or more words. The text may, for example, be a sentence or a paragraph. Embeddings representing in the vector space respective texts of the text source may be generated. These embeddings may be referred to as text embeddings. The text embeddings may be advantageous as they may commonly be produced at once, e.g., using a common encoding step, instead of producing them for every task. This may reduce the disk space requirement and improve the search, which can stay in one embedding space instead of multiple embedding spaces, which may increase efficiency in usage. This may allow comparability of embeddings of different token types, and harnessing multi-task learning/training benefit.

The present subject matter may further be advantageous as it may use machine learning for information retrieval. This may further improve the accuracy, recall, and precision of the information retrieval. For example, a pre-trained embedding generation model may be provided. The embedding generation model may, for example, be a deep neural network or another model that predicts embeddings according to the present subject matter. The embedding generation model may have trainable parameters such as weights of a neural network. The embedding generation model is pre-trained to generate for an input query Q an embedding in the vector space. The input query Q may comprise text. The input query Q may be separated into text fragments. The text fragment may have a size (e.g., the size may be the number of characters) smaller than a predefined maximum size, wherein the maximum size may be a variable that depends on the embedding generation model being used. The text fragments may, for example, comprise words, word contexts, sentences, chunks, paragraphs, documents, etc. The separation of the text may, for example, comprise tokenization of the text. The resulting fragments of the input query Q may be referred to as query tokens. The pre-trained embedding generation model may receive as input a set of query tokens obtained from a query text Q and may provide as an output an embedding representing the query text in the vector space. The embedding may uniquely represent the query text Q in the vector space. The embedding may be a vector of numbers. The vector may have a size that may be the dimension of the vector space. In one example, the query text Q provided as input to the embedding generation model may be pre-processed, and the resulting pre-processed query is input to the embedding generation model. The pre-processing may, for example, use data descriptive of a query context. The data may, for example, comprise a request history and user information. The pre-processing may, for example, comprise reformulating the query Q using the data and/or replacing special characters. The pre-processing may increase the accuracy of the information retrieval because the generated embedding may accurately represent the pre-processed query compared to unprocessed query Q, which may have extra unnecessary words that affect the embedding generation.

The present subject matter may further improve the information retrieval by enhancing the functionality of the embedding generation model. The embedding generation model may be fine-tuned with additional tasks. For that, the present subject matter may split the set of input tokens of the embedding generation model into two subsets. The first subset of input tokens may be tokens of a query text Q to be represented in the vector space. The first subset of input tokens may be referred to as the first subset of query tokens. The second subset of input tokens may comprise a number N of input tokens, where N≥1. The tokens of the second subset may be referred to as task tokens. Each task token in the second subset may represent a prediction of a distinct supplement of the query Q. The supplement of the query Q may, for example, comprise any one of: a next query subsequent to the query Q, an answer of the query Q, a next sentence of the query Q, a previous query preceding the query Q, a next paragraph of the query Q, a previous paragraph of the query Q, a next word of the query Q, a summary of the query Q, a translation of the query Q, a paraphrased text of the query Q, an entity represented by the query Q, a type of the entity Q, a domain of the query Q, a numerical value related to the query Q, a temporal value related to the query Q, a profile related to the query Q, a location related to the query Q, a media file related to the query Q, an extended query of the query Q, a query history, a previous answer, an answer history, actions related to an environment, a labelling, and a set of labels. The actions related to the environment may be interpreted by an agent in an environment. For example, the agent may query the model for options of actions in an environment via a query. The query could contain environment information, agent objectives, or other knowledge exploration and expansion-targeted input. Thus, the N task tokens may represent different N supplements of the query Q respectively.

For each task token of the N task tokens, the embedding generation model may be configured to predict an embedding given the embeddings of the query tokens of the query Q, wherein the predicted embedding is an embedding of a prediction of the supplement of the query Q. For example, if the supplement of the query Q is an answer to the query Q, the embedding generation model may be configured to predict an answer embedding given the embeddings of the query tokens, wherein the answer embedding is the embedding of a prediction of an answer to the query Q. For that, the embedding generation model may be trained to learn to associate a predicted embedding of each task token of the second subset of task tokens with the embedding of the supplement of a query being processed, given the embedding of the query being processed. The training may, for example, involve minimizing a loss function that measures the discrepancy between the predicted embedding of the task token and the embedding of the supplement of the query Q. The training may, for example, be carried out by backpropagation, which adjusts the model weights via gradient descent steps.

In one example, the training of the embedding generation model may be performed using multi-task learning (MTL) according to which the determinations of the embeddings of the query tokens and the task tokens may be considered as different but related tasks. The MTL of the embedding generation model may be performed using a shared representation. This may be advantageous as the resulting trained embedding generation model may generalise better and make more accurate predictions than a model for a single task. For example, if the embedding generation model is a deep neural network, with the MTL, the input tokens share the same hidden representations. The present subject matter may provide a unique combination of multi-task learning and token-based embedding generation. The embedding generation model may forecast multiple types of embeddings defined for different supplements (e.g., next query, answers, etc) of text, that are not present in the input text Q (e.g., the answer or next query is not available in the original user query). As each of these task tokens can be attributed to a different task (e.g., predict answer or predict next query) and are learned via a shared representation space, the benefits of multi-task learning may be applicable to the present method. Hence, generating multi-type embeddings of unseen text using multiple, specifically trained, input token types may be enabled.

In order to train the embedding generation model, a training dataset may be provided. The training dataset comprises records, wherein each record of the records may comprise a number 2N+1 of entries. An entry of the entries comprises an input text representing a query. N other entries of the record comprise second input texts representing the N supplements of the query respectively. The N remaining entries of the record comprise the N task tokens respectively. Alternatively, the N task tokens may be provided at once as they are the same for all records of the training dataset, that is, each record may comprise N+1 entries without the N task tokens as the N task tokens may be provided separately at once. The N task tokens may, for example, be fixed to respective predefined values. Alternatively, the N task tokens may be derived from the respective N second input texts. For example, a correspondence between the N second input texts and N task tokens may be sequential so that a second input text at position i may always refer to a respective task token. This may avoid having to name the task tokens in the training dataset, which may only have N+1 entries per record. This may provide a simplified method of training. After training, the task tokens may be provided as a signal indicating to the embedding generation model which has, at this point, learned to associate them with a specific encoding function to respective embeddings, and thus can be used by the embedding generation model to generate embeddings. In one example, the model may be further trained (e.g., according to the so-called "continual learning") after the training step, in order to improve its capabilities to interpret task tokens, or adding additional task tokens at later stages given some user feedback or additional information sources.

During the training, the embedding generation model may receive in each iteration a record as input, may tokenize the query in the record to obtain query tokens, and also tokenize the N supplements of the query. In each iteration, the embedding generation model may perform a first training step. The first training step comprises generating the embeddings of the query tokens and predicting N embeddings (task embeddings) of the N task tokens given the embeddings of the query tokens. In addition, the embedding generation model may perform a second training step to generate N embeddings (supplement embeddings) of the N supplements of the query. The first training step and second training step may be performed in parallel using multiple copies of the embedding generation model or performed sequentially using one embedding generation model. For example, when using the multiple copies, the different trained weights of the copies may be combined into one model with one combined set of weights. Alternatively, the multiple models may be provided with shared weights (e.g., such as Siamese neural networks) or be provided in accordance with sequential approaches. The embedding generation model may compare the N supplement embeddings or a subset of the N supplement embeddings with the respective predicted task embeddings and based on the comparison, the trainable parameters of the embedding generation model may be changed for a next iteration so that the predicted embeddings may become more similar to the respective supplement embeddings. The training may, for example, be performed in a computer system referred to as training system.

Different advantageous techniques may be used to implement the training. In one example, the training may be performed according to a Siamese neural network architecture in which each neural network of the architecture is the embedding generation model. This may enable to perform in each training iteration the above described first and second training steps in parallel. Alternatively, only one model may be used to sequentially perform in each training iteration the first and second training steps.

After being trained, the embedding generation model may advantageously be used e.g., at a computer system, to perform information retrieval from the text source. The computer system may be referred to as inference system. In one example, the inference system may be the training system. In another example, the inference system may be different from the training system. For example, a query comprising text may be received at the inference system. The query may, for example, be received from a user. The user may refer to an entity, e.g., an individual, a group of individuals, a computer, or an application executing on a computer that issues queries. The text source may comprise information that satisfies the received query. The received query may be tokenized to obtain query tokens. The query tokens as well as a number $N^1$ of task tokens may be provided as input to the embedding generation model. If, for example, the embedding generation model is a deep neural network, the query tokens and the $N^1$ task tokens may be input into the input layer of the deep neural network.

Alternatively, part of the $N^1$ task tokens or all the $N^1$ task tokens may be provided as input to the deep neural network by introducing them later into the deep neural network (e.g., in one of the hidden layers). The $N^1$ task tokens used for the inference is part of or all the second subset of N task tokens used in the training. That is, the number $N^1$ of task tokens may be smaller than or equal to the number N of task tokens used in the training, i.e., $1 \leq N^1 \leq N$. In the following, the number $N^1$ of task tokens used during the inference is equal to the number N of task tokens which is used during the training, but it is not limited to as the skilled person in the art, having access to the present description, can use any number of task tokens between 1 and N for implementing the inference of the embedding generation model. In response to receiving the input, the embedding generation model may output a set of N+1 embeddings, wherein one embedding (query embedding) represents the received query and the remaining N embeddings (task embeddings) represent the N task tokens respectively. Text embeddings of the text source that match the set of N+1 embeddings may be identified, e.g., by the inference system. In one example, for each embedding of the set of N+1 embeddings, a set of one or more matching text embeddings may be identified. This may result in N+1 sets of text embeddings. The texts that are represented by the N+1 sets of text embeddings may be generated. For example, the N+1 sets of text embeddings may be input of a conditional text generation model/process that produces these texts. Alternatively, or additionally, the texts of the text source that are represented by the N+1 sets of text embeddings may be retrieved from the text source by the inference system. These retrieved texts may comprise N+1 sets of texts associated with the query and the task tokens respectively.

Alternatively, the set of N+1 embeddings may be combined in order to obtain a combined embedding. Text embeddings that match the combined embedding may be identified in the text embeddings. The combination may, for example, comprise a weighted sum of the set of N+1 embeddings using weights assigned to the set of N+1 embeddings based on importance of the associated task, e.g., the embedding of the query may have the highest weight 100%, the answer embedding may have a weight of 70%, and the next sentence embedding may have a weight of 30%. The combination may, in another example, comprise the sum or average of the embeddings.

In one example, the search in the text embedding may be performed using a k-nearest neighbor search, so that that the matching text embeddings for a given searched embedding may comprise a number k of text embeddings obtained by the k-nearest neighbor search. Each of the text embeddings found may be associated with a similarity score. The similarity score of a text embedding X indicates the similarity between the text embedding X and the generated embedding Y being searched. That is, the text embedding X has been found as a result of searching the generated embedding Y. The similarity score may, for example, be a distance between text embedding X and generated embedding Y. The distance may, for example, be a cosine distance. The similarity score of the text embedding X may be weighted by a given weight (e.g., between 0 and 1) based on the type of the generated embedding Y. For example, if the generated embedding Y represents the query, then the weight may have the highest value, e.g., 1; if the generated embedding Y represents the supplement of the query that is the answer to the query, then the weight may have a smaller value; and so on.

In another example, the weight associated with the text embedding X may be based on its similarity with the generated embedding Y, distance to the generated embedding Y, its popularity, its frequency, previous user feedback on the text embedding X, its correspondence to a (user) attribute, domain-specific detail, etc.

Alternatively, the text embeddings may be weighted based on a measure (e.g., correspondence, relevance) that is determined by another machine learning model such as a classification or regression model, e.g., this other model may receive as input a set of M text embeddings and classify correspondence between these embeddings.

The weight associated with the same type generated embedding Y may also change over time from one iteration to another iteration of the training or the inference, e.g., the weight of the generated embedding Y representing the query may get smaller and smaller, while the weight of the generated embedding Y representing the answer may get higher and higher. Alternatively, the search may be performed using a threshold similarity search that searches for text embeddings whose similarity scores are higher than a threshold.

Hence, at this stage, the inference system may have access to retrieved texts that may provide accurate results for the received query. The present subject matter may provide at least part of the retrieved texts.

In one example, all the retrieved texts may be provided (e.g., displayed) to the user. This may be advantageous because the retrieved texts are related to the query and may thus be useful for the user.

Alternatively, only part of the retrieved texts may be provided (e.g., displayed) to the user. For example, only a number J of sets of texts of the N+1 sets of texts may be provided. The provided J sets of texts may comprise at least the set of texts associated with the query. In one example, J=2, meaning that the provided J sets of texts consist of two sets of texts. The provided two sets of texts may comprise the set of texts that are associated with the query in addition to the set of texts associated with one selected supplement (of the N supplements). The selected supplement may be the answer of the query but it is not limited to being the answer of the query. This may be advantageous as it may not overload the user with many results and the provided results may be enough and accurate results for the user.

The information retrieval according to the present subject matter may further be improved by increasing the number of retrieved texts without relying on further queries or inputs from the user. For that, one or more task tokens of the N task tokens used during the previous inference of the embedding generation model may be selected. In one example, the selection may be a random selection.

Alternatively, the selected one or more task tokens may be part of a predefined list of desired task tokens. Each individual text of the texts retrieved for these selected task tokens may be used as a query for a next iteration of the present method. That is, the method may be repeated for each text of the retrieved texts of the selected task tokens.

Alternatively, only selected texts of the texts retrieved for these selected task tokens may be used as a query for a next iteration of the present method. The selected texts may be randomly selected or selected based on a ranking, e.g., the first k ranked texts of each selected task token may be selected. The ranking of texts of each task token may be based on the similarity scores of associated text embedding. For example, the search of a generated embedding Y may result in two text embeddings X1 and X2 (search result embeddings) whose respective texts txt1 and txt2 are retrieved or generated. Texts txt1 and txt2 may be ranked based on the similarity between X1 and Y and the similarity between X2 and Y, respectively.

Alternatively, ranking of the texts of each task token may be based on other parameters than the similarity, namely, the ranking may be based on (a) how successful the search result embedding was for past queries, e.g., measured via a user interaction, (b) popularity of the search result embedding, (c) number of and/or distances to available answer embeddings or other task-specific embeddings, (d) correspondence to a user profile, (e) how general or domain-specific the search result embedding query is, (f) a selection function based on another machine learning model (e.g., neural network) which could, for example, evaluate and rank the relevance or correspondence, and (g) how well the content of and/or user intention of the query could be disambiguated.

In each repetition of the method, the task tokens used are part of the N task tokens used in the training. In addition, the task tokens used in each repetition of the method may or may not be equal to the task tokens used in the previous execution of the method. For example, for a first execution of the method, the task tokens may comprise two task tokens representing next query and answer supplements, and in the second execution, the task tokens may comprise three task tokens representing answer supplement, next sentence supplement, and previous query supplement. The task tokens to be used in each iteration may be defined manually based on observations that involve, e.g., the application being used, requirements, domain, user feedback, embedded type of data objects, length of texts (fragments), etc.

For example, a user may be informed of the available task tokens, and the user may select which task tokens should be used.

Alternatively, the task tokens to be used in each iteration may be predicted based on criteria like user feedback, text content, query type, content length, domain, disambiguation, open-endedness, etc. The prediction may be done by the embedding generation model or by a second machine learning model. In the case where the embedding generation model predicts the needed task tokens, one of the task tokens may be the "TASKS" that embeds which other task tokens should be used.

The present subject matter may further improve the presentation of the results to the users by using a summary generation module. The summary generation module may receive as input the set of texts that are associated with the query in addition to one or more sets of texts associated with one or more selected supplements (of the N supplements), respectively. The summary generation module may generate a summary for the received sets of texts. The summary may, for example, be displayed on a display device of the inference system. Providing a summary may improve the quality of the information retrieval by focusing only on relevant parts of information the user may want to have access to.

The present subject matter may require that the second subset of task tokens comprises one task token that represents the supplement that is a next query of the received query. This may be advantageous as it may enable increasing the retrieved information and thus provide more accurate results (e.g., with higher recall). For that, the set of texts, of the N+1 sets of texts, that is associated with this task token representing the next query may be identified. The identified set of texts may, for example, comprise M texts. In one example, all or part of the set of texts may further be used. For example, K texts may be selected from the set of M texts, where K≤M. The selected K texts may be used as a set of K queries that can be searched separately. For that, the present method may be repeated K times, wherein in each repetition one text of the selected K texts may be used as the query Q. This may result in K×(N+1) sets of texts, wherein the provided texts may comprise K×J sets of texts. In another example, one text (or several texts) of the K texts may be input into the embedding generation model alongside the original query. For instance, the input may, for example, comprise the following tokens: [tokens_orig_query], [tokens_supplement_query_1], and [tokens_supplement_query_2]. Inputting original and supplement queries together into the model can give the model more information resulting in more accurate and specific further supplement embeddings.

In one example, the embedding generation model may be a deep neural network having multiple layers. The input layer of the embedding generation model may comprise a number of nodes equal to or higher than the number of query tokens plus the number of task tokens. The output layer may comprise N+1 nodes, one node for the query, and the additional N nodes for the N token tasks, respectively. Each query token may be embedded to a vector after inputting it to the embedding generation model. The query token may be processed through the layers of the embedding generation model. The embeddings of the query tokens may be combined to obtain a global embedding that represents the whole query. The combination of the embeddings may, for example, be the sum, maximum, concatenation, average of the embeddings, or any other function combining the embeddings. For example, the function may be implemented by a rule-based system, e.g., weighting specific token embeddings stronger than others (e.g., nouns and verbs may be weighted differently) or by another neural network (e.g., one that is trained on creating a meaningful query embedding based on any set of input tokens). In addition, each task token may be embedded to a vector after inputting it to the embedding generation model. This vector may be the embedding associated with the task token.

In one example, the embedding generation model may comprise multiple deep neural networks each being associated with a respective task token. The deep neural networks may share the same embedding latent space, e.g., via tied weights. Each deep neural network may comprise in the input layer nodes for the query tokens and an additional node for the corresponding token task. This may be advantageous as it may enable parallel processing for each task, and higher flexibility of model input length, e.g., in case of lengthy previously extracted knowledge needed for next sentence embedding prediction.

FIG. 1 depicts a diagram of an information retrieval system in accordance with an embodiment of the present invention.

The information retrieval system 100 comprises a computer system 101 and a text source 103 interconnected over network 102. The text source 103 may comprise multiple sources 103.1 through 103.L. The computer system 101 may be configured to communicate with the sources 103.1-L through one or more networks 102. Only one network is shown for simplification of the description but it is not limited to. The network 102 may, for example, comprise a wireless local area network (WLAN), WAN (Wide Area Network), LAN (Local Area Network), the internet, or a combination thereof. The computer system 101 may comprise an embedding generation model 107 according to the present subject matter. Alternatively, the embedding generation model 107 may be part of a remote system such as a source system of the source systems 103.1-L. In this case, the computer system 101 may be configured to remotely control the operation of the embedding generation model 107. The embedding generation model 107 is configured to receive as input query tokens as well as a number N of task tokens, where N≥1. In response to receiving the input, the embedding generation model may output a set of N+1 embeddings, wherein one embedding (query embedding) represents the received query and the remaining N embeddings (task embeddings) represent the N task tokens respectively.

The computer system 101 may further comprise text embeddings 109. The text embeddings may be embeddings that represent texts of the text source 103 in the vector space. Each text embedding may be associated with information indicating the source that comprises the corresponding text. Alternatively, the text embeddings 109 may be stored in the respective sources 103.1-L.

Figure 2:
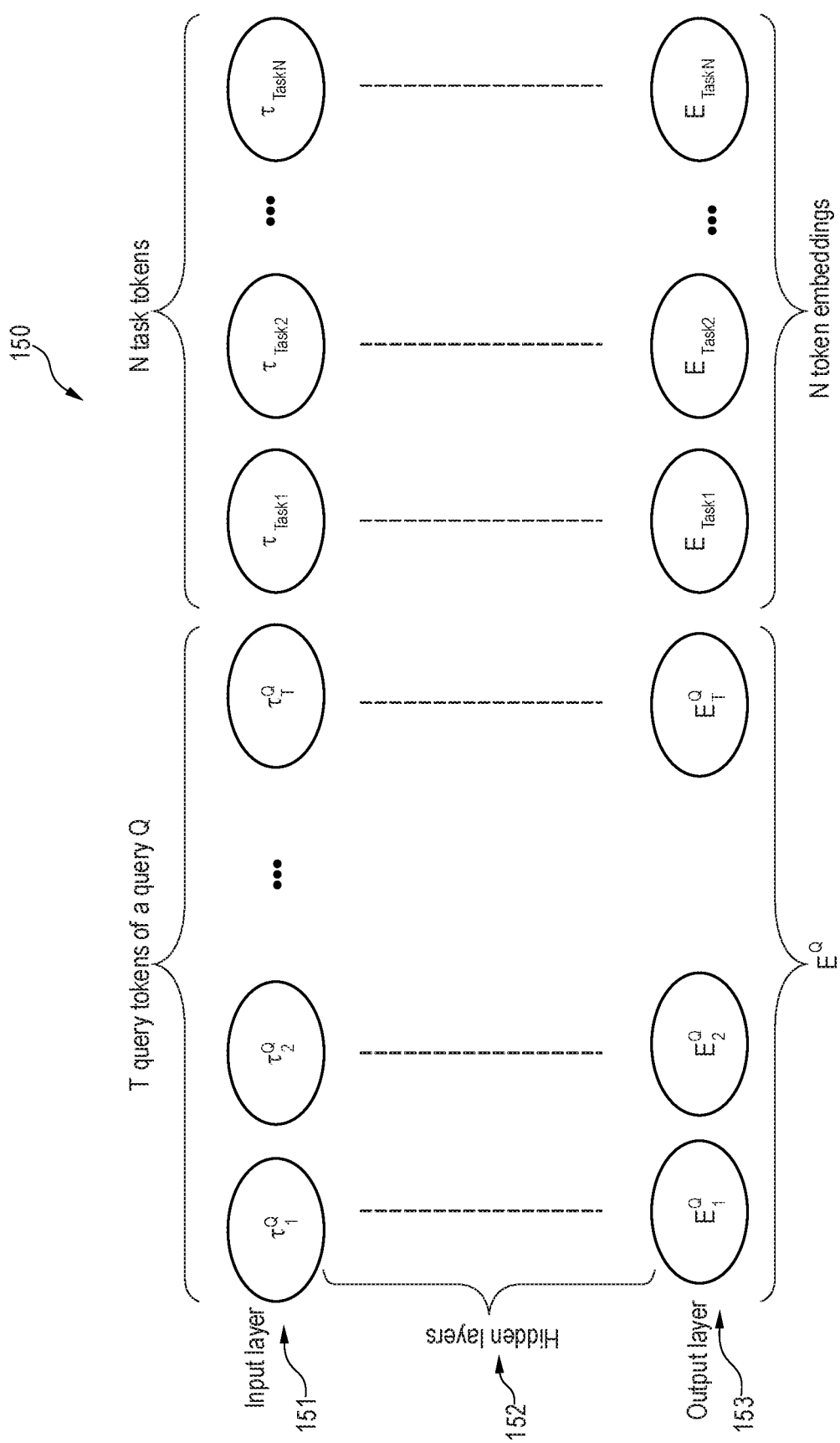
FIG. 2 depicts a diagram of an embedding generation model according to an embodiment of the present invention.

FIG. 2 depicts a diagram of an embedding generation model according to an embodiment of the present invention. The embedding generation model may comprise a deep neural network 150. The deep neural network 150 comprises multiple layers. The multiple layers comprise an input layer 151, hidden layers 152, and an output layer 153.

The input layer 151 comprises nodes for receiving query tokens of a received query and for receiving N task tokens, where N≥1. For example, the tokenization of the query may result in T query tokens: $\tau_1^Q, \tau_2^Q \ldots \tau_T^Q$, where the upper index Q refers to the query. The N task tokens may be referred to as $\tau_{Task1}, \tau_{Task2} \ldots \tau_{TaskN}$ respectively. The nodes of the hidden layers 152 are not shown for simplification of the drawing.

The output layer 153 comprises nodes for the generated embeddings. In particular, the nodes of the output layer 153 comprise T query embeddings $E_1^Q, E_2^Q \ldots E_T^Q$ of the T query tokens: $\tau_1^Q, \tau_2^Q \ldots \tau_T^Q$ respectively. The nodes of the output layer 153 may comprise N task embeddings $E_{Task1}, E_{Task2} \ldots E_{TaskN}$ of the N task tokens $\tau_{Task1}, \tau_{Task2} \ldots \tau_{TaskN}$ respectively. As indicated in FIG. 2, the output layer 153 may further be configured to combine the T query embeddings $E_1^Q, E_2^Q \ldots E_T^Q$ to provide a global embedding $E^Q$ that represents the query Q. The global embedding $E^Q$ may, for example, be the sum or average of the T query embeddings $E_1^Q, E_2^Q \ldots E_T^Q$, $E^Q = \Sigma_{j=1}^T E_j^Q$ or $$E^Q = \frac{\sum_{j=1}^T E_j^Q}{T}.$$

The embedding generation model may be trained using one or more loss functions. The loss function may, for example, comprise a classification objective function with cross-entropy loss, triplet objective function with triplet loss function, regression objective function based on a distance function (e.g., cosine distance, angular distance, Euclidean distance, etc.) with mean-squared error (or e.g., mean absolute error) as loss, contrastive loss function, ArcFace loss function, SphereFace loss function, or CosFace loss function.

Figure 3:
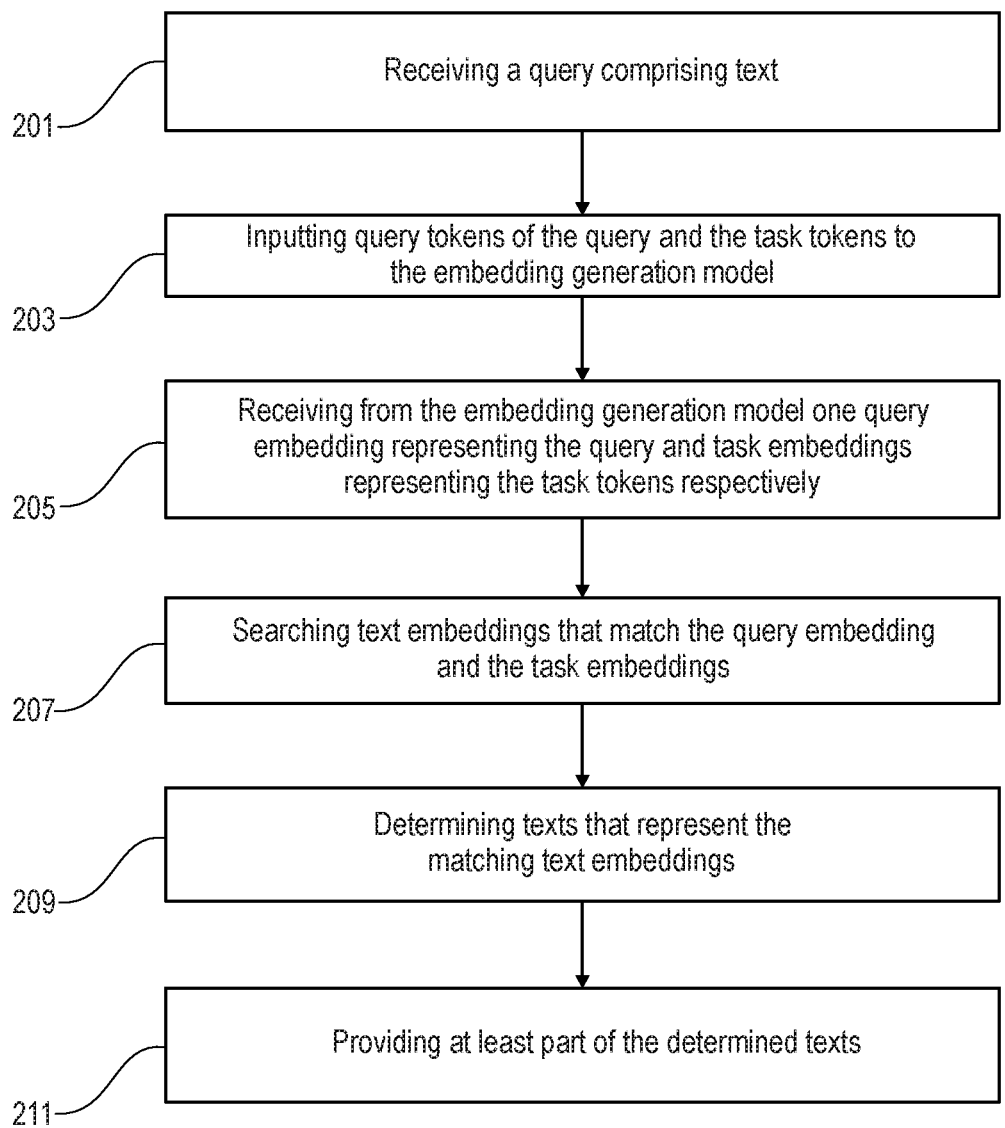
FIG. 3 is a flowchart of a method for information retrieval in accordance with an embodiment of the present invention.

FIG. 3 is a flowchart of a method for information retrieval in accordance with an embodiment of the present invention. For the purpose of explanation, the method of FIG. 3 may be implemented in the system illustrated in previous FIG. 1 but is not limited to this implementation. The method of FIG. 3 may, for example, be performed by the computer system 101.

A query $Q^1$ comprising text may be received in step 201. The received query $Q^1$ may be tokenized resulting in a number $T^1$ of query tokens $$\tau_1^{Q^1}, \tau_2^{Q^1} \ldots \tau_{T^1}^{Q^1}$$

of the received query $Q^1$, where $T^1 \geq 1$.

The query tokens $$\tau_1^{Q^1}, \tau_2^{Q^1} \ldots \tau_{T^1}^{Q^1}$$

as well as the N task tokens $\tau_{Task1}^1, \tau_{Task2}^1 \ldots \tau_{TaskN}^1$ may be input in step 203 to the embedding generation model 107. In response to inputting the tokens to the embedding generation model 107, the embedding generation model 107 may output, in step 205, N+1 embeddings, wherein one embedding (query embedding) $E^{Q^1}$ represents the received query $Q^1$ and the remaining N embeddings (task embeddings) $E_{Task1}^1, E_{Task2}^1 \ldots E_{TaskN}^1$ represent the N task tokens $\tau_{Task1}^1, \tau_{Task2}^1 \ldots \tau_{TaskN}^1$ respectively.

The computer system 101 may search, in step 207, in the text embeddings 109 text embeddings that match the N+1 embeddings, $E^{Q^1}, E_{Task1}^1, E_{Task2}^1 \ldots E_{TaskN}^1$. This may result in a set of search result embeddings per embedding of the N+1 embeddings $E^{Q^1}, E_{Task1}^1, E_{Task2}^1 \ldots E_{TaskN}^1$. For example, for each generated embedding of the N+1 embeddings $E^{Q^1}, E_{Task1}^1, E_{Task2}^1 \ldots E_{TaskN}^1$, the computer system 101 may compute a distance between the generated embedding and text embeddings. The distance, may, for example, be a cosine distance. The text embeddings that are close to the generated embedding e.g., within a defined maximum distance, may be selected as matching text embeddings of the generated embedding.

Texts represented by the selected matching text embeddings may be determined in step 209, e.g., by generation or retrieval. For example, texts represented by the selected matching text embeddings may be retrieved in step 209 by the computer system 101 from the respective sources 103.1-L where they are stored. For the query embedding $E^{Q^1}$, a number $r_0^1$ of texts $$\text{Text}_1^{E^{Q^1}}, \text{Text}_2^{E^{Q^1}} \ldots \text{Text}_{r_0^1}^{E^{Q^1}}$$

may be retrieved, where $r_0^1 \geq 0$. For each $j^{th}$ task embedding $E_{Taskj}^1$, where j varies between 1 and N, a number $r_j^1$ of texts $$\text{Text}_1^{E_{Taskj}^1}, \text{Text}_2^{E_{Taskj}^1} \ldots \text{Text}_{r_j^1}^{E_{Taskj}^1}$$

may be retrieved, where $r_j^1 \geq 0$, meaning that there may be an embedding for which no text is found. The total number of retrieved texts may thus be $\Sigma_{j=0}^N r_j^1$.

At least part of the determined (e.g., retrieved) texts may be provided in step 211. The at least part of the retrieved texts may comprise the $r_0^1$, texts retrieved for the query embedding $E^{Q^1}$ in addition to retrieved texts of one or more selected task embeddings. For example, the selection may be performed based on the supplements represented by the task embeddings. If, for example, the task embedding $E_{Task2}^1$ is selected, then the at least part of the retrieved texts may comprise the $r_0^1$, texts retrieved for the query embedding $E^{Q^1}$ in addition to the $r_2^1$ texts retrieved for the task embedding $E_{Task2}^1$.

Figure 4:
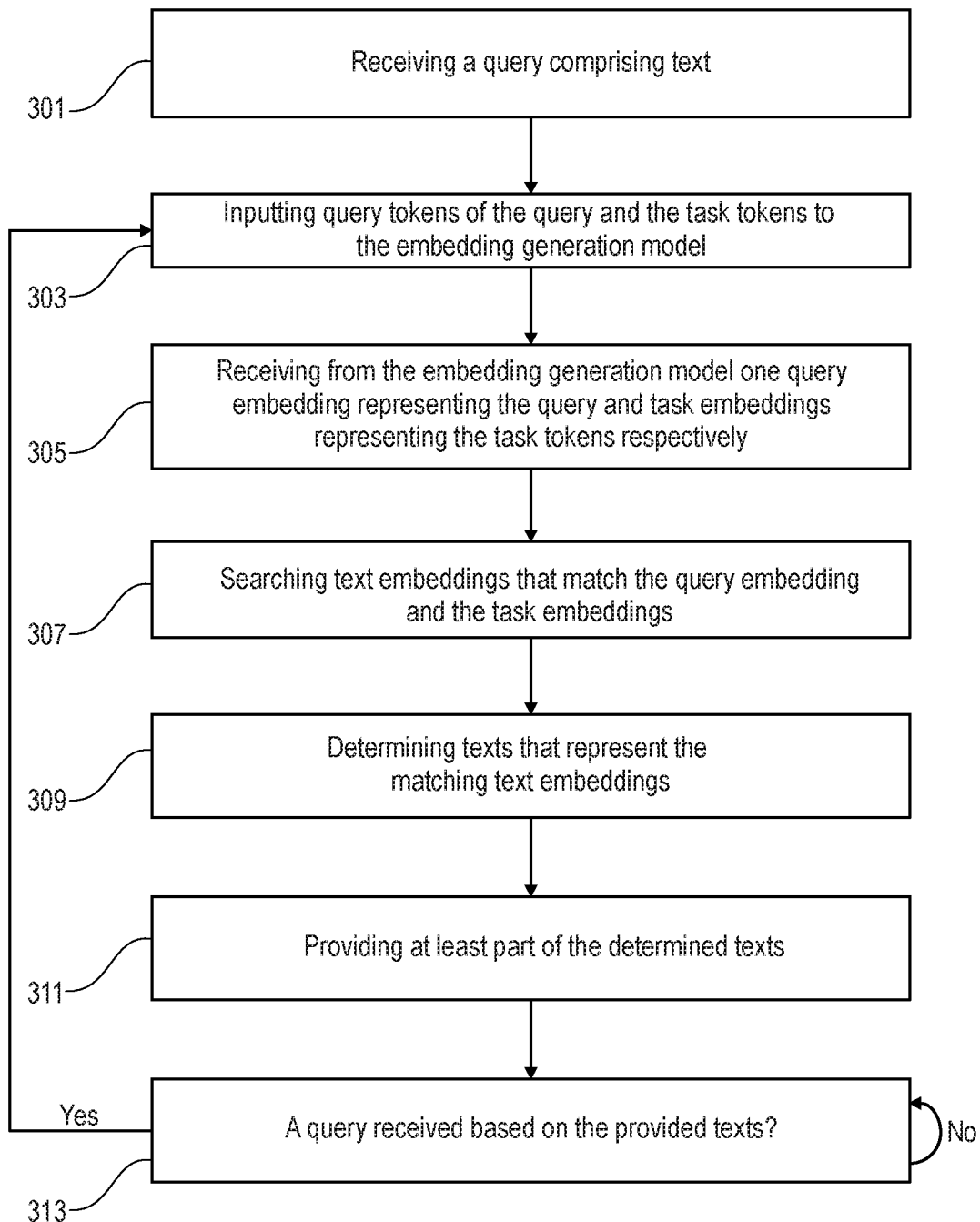
FIG. 4 is a flowchart of a method for information retrieval in accordance with an embodiment of the present invention.

FIG. 4 is a flowchart of a method for information retrieval in accordance with an embodiment of the present invention. For the purpose of explanation, the method of FIG. 4 may be implemented in the system illustrated in previous FIG. 1 but is not limited to this implementation. The method of FIG. 4 may, for example, be performed by the computer system 101.

A query $Q^1$ comprising text may be received in step 301. The received query $Q^1$ may be tokenized resulting in a number $T^1$ of query tokens $$\tau_1^{Q^1}, \tau_2^{Q^1} \ldots \tau_{T^1}^{Q^1}$$

of the received query $Q^1$, where $T^1 \geq 1$.

The query tokens $$\tau_1^{Q^1}, \tau_2^{Q^1} \ldots \tau_{T^1}^{Q^1}$$

as well as the N task tokens $\tau_{Task1}^1, \tau_{Task1}^1, \tau_{Task2}^1 \ldots \tau_{TaskN}^1$ may be input in step 303 to the embedding generation model 107. In response to inputting the tokens to the embedding generation model 107, the embedding generation model 107 may output, in step 305, N+1 embeddings, wherein one embedding (query embedding) $E^{Q^1}$ represents the received query $Q^1$ and the remaining N embeddings (task embeddings) $E_{Task1}^1, E_{Task2}^1 \ldots E_{TaskN}^1$ represent the N task tokens $\tau_{Task1}^1, \tau_{Task2}^1 \ldots \tau_{TaskN}^1$ respectively.

The computer system 101 may search, in step 307, in the text embeddings 109 text embeddings that match the N+1 embeddings, $E^{Q^1}, E_{Task1}^1, E_{Task2}^1 \ldots E_{TaskN}^1$. This may result in a set of search result embeddings per embedding of the N+1 embeddings $E^{Q^1}, E_{Task1}^1, E_{Task2}^1 \ldots E_{TaskN}^1$. For example, for each generated embedding of the N+1 embeddings $E^{Q^1}, E_{Task1}^1, E_{Task2}^1 \ldots E_{TaskN}^1$, the computer system 101 may compute a distance between the generated embedding and text embeddings. The distance, may, for example, be a cosine distance. The text embeddings that are close to the generated embedding, e.g., within a defined maximum distance, may be selected as matching text embeddings of the generated embedding.

Texts represented by the selected matching text embeddings may be determined in step 309, e.g., by generation or retrieval. For example, texts represented by the selected matching text embeddings may be retrieved in step 309 by the computer system 101 from the respective sources 103.1-L where they are stored. For each $j^{th}$ task embedding $E_{Taskj}^1$, where j varies between 1 and N, a number $r_j^1$ of texts $$\text{Text}_1^{E_{Taskj}^1}, \text{Text}_2^{E_{Taskj}^1} \ldots \text{Text}_{r_j^1}^{E_{Taskj}^1}$$

may be retrieved, where $r_j^1 \geq 0$, meaning that there may be an embedding for which no text is found. The total number of retrieved texts may thus be $\Sigma_{j=1}^N r_j^1$. At least part of the retrieved texts may be provided in step 311.

The at least part of the determined (e.g., retrieved) texts may be provided, for example, to a user who sent the query $Q^1$. In response to providing the at least part of the retrieved texts, the computer system 101 may determine in step 313 whether another query $Q^2$ is received from the user based on provided texts. Upon receiving the query $Q^2$, the method steps 303 to 313 may be repeated. The repetition may be performed until a maximum number of repetitions is reached, a maximum processing time is reached, or until it is determined (automatically or manually) that sufficient information has been retrieved to satisfy the user request or its underlying need for information. In this repetition, the query $Q^2$ may be tokenized resulting in a number $T^2$ of query tokens $$\tau_1^{Q^2}, \tau_2^{Q^2} \ldots \tau_{T^2}^{Q^2}$$

of the received query $Q^2$, where $T^2 \geq 1$. The query tokens $$\tau_1^{Q^2}, \tau_2^{Q^2} \ldots \tau_{T^2}^{Q^2}$$

as well as the N task tokens $\tau_{Task1}^1, \tau_{Task2}^1 \ldots \tau_{TaskN}^1$ the same task tokens used for the previous query $Q^1$) may be input in step 303 to the embedding generation model 107. The embedding generation model 107 may output N+1 embeddings, wherein one embedding (query embedding) $E^{Q^2}$ represents the received query $Q^2$ and the remaining N embeddings (task embeddings) $E_{Task1}^2, E_{Task2}^2 \ldots E_{TaskN}^2$ represent the N task tokens $\tau_{Task1}^1, \tau_{Task2}^1 \ldots \tau_{TaskN}^1$ respectively. It has to be noted that although the same task tokens are used for both queries $Q^1$ and $Q^2$, the task embeddings $E_{Task1}^2, E_{Task2}^2 \ldots E_{TaskN}^2$ may not be the same as the task embeddings generated for query $Q^1$, $E_{Task1}^1, E_{Task2}^1 \ldots E_{TaskN}^1$. Thus, repeating the method may advantageously increase the diversity and sequential information of the retrieved texts. The retrieved texts for this second query $Q^2$ may be as follows. For the query embedding $E^{Q^2}$, a number $r_0^2$ of texts $$\text{Text}_1^{E^{Q^2}}, \text{Text}_2^{E^{Q^2}} \ldots \text{Text}_{r_0^2}^{E^{Q^2}}$$

may be retrieved, where $r_0^2 \geq 0$. For each $j^{th}$ task embedding $E_{Taskj}^2$, where j varies between 1 and N, a number $r_j^2$ of texts $$\text{Text}_1^{E_{Taskj}^2}, \text{Text}_2^{E_{Taskj}^2} \ldots \text{Text}_{r_j^2}^{E_{Taskj}^2}$$

may be retrieved, where $r_j^2 \geq 0$, meaning that there may be an embedding for which no text is found. The total number of retrieved texts for query $Q^2$ may thus be $\Sigma_{j=0}^N r_j^2$. The total number of retrieved texts for all queries $Q^1$ and $Q^2$ is: $\Sigma_{j=0}^N r_j^1 + r_j^2$.

Figure 5:
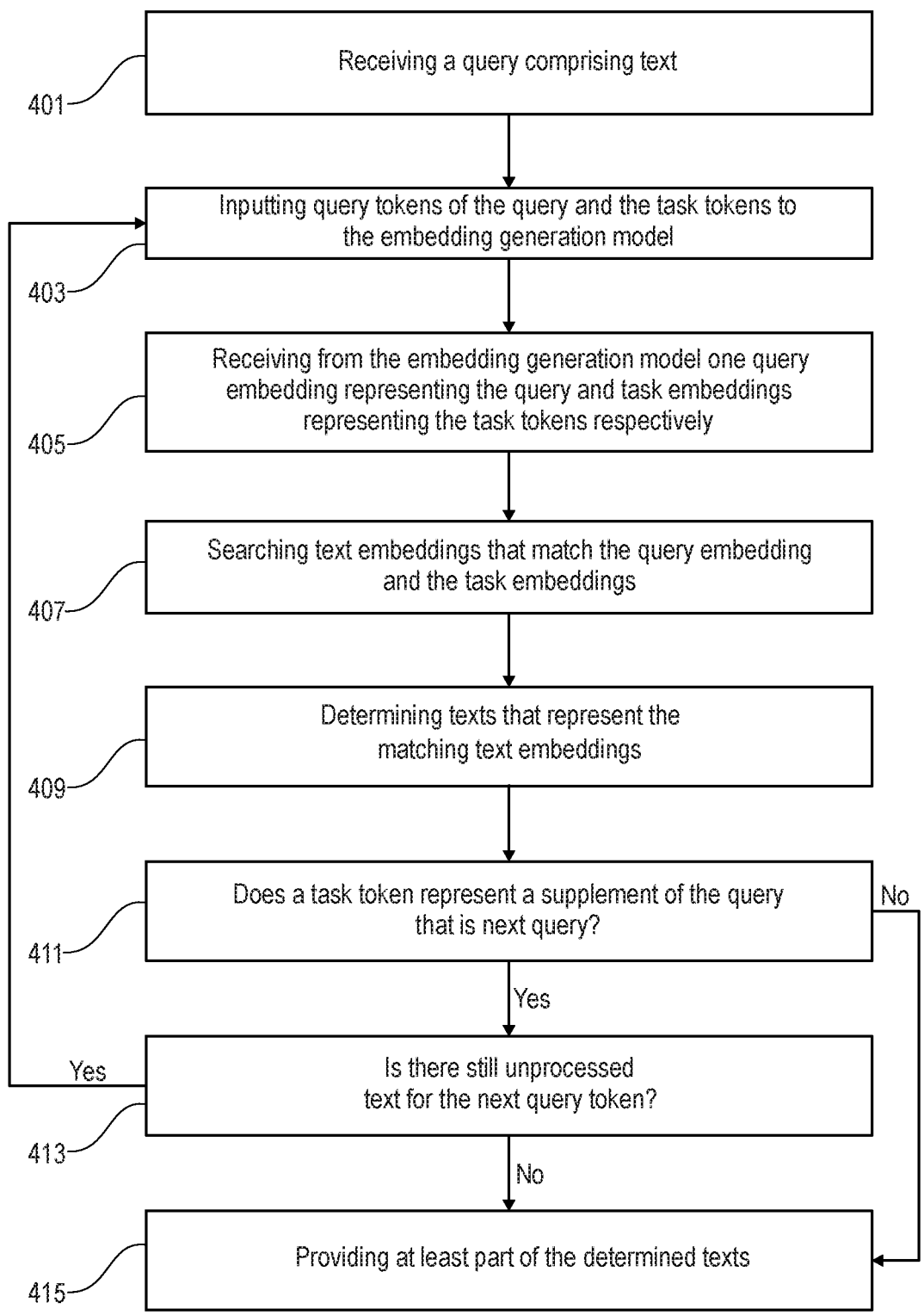
FIG. 5 is a flowchart of a method for information retrieval in accordance with an embodiment of the present invention.

FIG. 5 is a flowchart of a method for information retrieval in accordance with an embodiment of the present invention. For the purpose of explanation, the method of FIG. 5 may be implemented in the system illustrated in previous FIG. 1 but is not limited to this implementation. The method of FIG. 5 may, for example, be performed by the computer system 101.

A query $Q^1$ comprising text may be received in step 401. The received query $Q^1$ may be tokenized resulting in a number $T^1$ of query tokens $$\tau_1^{Q^1}, \tau_2^{Q^1} \ldots \tau_{T^1}^{Q^1}$$

of the received query $Q^1$, where $T^1 \geq 1$.

The query tokens $$\tau_1^{Q^1}, \tau_2^{Q^1} \ldots \tau_{T^1}^{Q^1}$$

as well as the N task tokens $\tau_{Task1}^1, \tau_{Task2}^1 \ldots \tau_{TaskN}^1$ may be input in step 403 to the embedding generation model 107. In response to inputting the tokens to the embedding generation model 107, the embedding generation model 107 may output, in step 405, N+1 embeddings, wherein one embedding (query embedding) $E^{Q^1}$ represents the received query $Q^1$ and the remaining N embeddings (task embeddings) $E_{Task1}^1, E_{Task2}^1 \ldots E_{TaskN}^1$ represent the N task tokens $\tau_{Task1}^1, \tau_{Task2}^1 \ldots \tau_{TaskN}^1$ respectively.

The computer system 101 may search, in step 407, in the text embeddings 109 text embeddings that match the N+1 embeddings, $E^{Q^1}, E_{Task1}^1, E_{Task2}^1 \ldots E_{TaskN}^1$. This may result in a set of search result embeddings per embedding of the N+1 embeddings $E^{Q^1}, E_{Task1}^1, E_{Task2}^1 \ldots E_{TaskN}^1$. For example, for each generated embedding of the N+1 embeddings $E^{Q^1}$, $E_{Task1}{}^1$, $E_{Task2}{}^1$ ... $E_{TaskN}{}^1$, the computer system 101 may compute a distance between the generated embedding and text embeddings. The distance may, for example, be a cosine distance. The text embeddings that are close to the generated embedding, e.g., within a defined maximum distance, may be selected as matching text embeddings of the generated embedding.

Texts represented by the selected matching text embeddings may be determined in step 409, e.g., by generation or retrieval. For example, texts represented by the selected matching text embeddings may be retrieved in step 409 by the computer system 101 from the respective sources 103.1-L where they are stored. For each $j^{th}$ task embedding $E_{Taskj}{}^1$, where j varies between 1 and N, a number $r^j$ of texts $$\text{Text}_1^{E^1_{Taskj}}, \text{Text}_2^{E^1_{Taskj}} \ldots \text{Text}_{r_j}^{E^1_{Taskj}}$$

may be retrieved.

It may be determined in step 411 if a task token of the N task tokens $\tau_{Task1}{}^1$, $\tau_{Task2}{}^1$ ... $\tau_{TaskN}{}^1$ represents the next query of the query $Q^1$. If so, and assuming, for example, that the task token $\tau_{Task1}{}^1$ represents the next query of the query $Q^1$, the $r_1{}^1$ texts $$\text{Text}_1^{E^1_{Task1}}, \text{Text}_2^{E^1_{Task1}} \ldots \text{Text}_{r_1}^{E^1_{Task1}}$$

retrieved for the task embedding $E_{Task1}{}^1$ may be ranked based on the computed distances between the task embedding $E_{Task1}{}^1$ and the found text embeddings. The first l ranked texts, where $l < r_1{}^1$, may be selected resulting in the selected texts $$\text{Text}_1^{E^1_{Task1}}, \text{Text}_2^{E^1_{Task1}} \ldots \text{Text}_l^{E^1_{Task1}}.$$

Alternatively, the ranking and the selection may not be performed. These selected texts may be used as queries for further execution of the method steps 403 to 413. For example, the next queries may be defined as follows:

$$Q^2 = \text{Text}_1^{E^1_{Task1}}, Q^3 = \text{Text}_2^{E^1_{Task1}} \ldots Q^l = \text{Text}_l^{E^1_{Task1}}.$$

As indicated by step 413 in FIG. 5, the method steps 403 to 413 may be repeated for each query of the additional queries $Q^2, Q^3 \ldots$ and $Q^{l+1}$. For example, if it is determined in step 413 that at least one query of the additional queries $Q^2, Q^3 \ldots$ and $Q^{l+1}$ is not yet processed, steps 403 to 413 may be repeated. This may result in a total number of retrieved texts equal to: $\Sigma_{k=1}^{l+1}\Sigma_{j=0}^{N}r_j^k$.

At least part of the determined (e.g., retrieved) texts may be provided in step 415.

Figure 6:
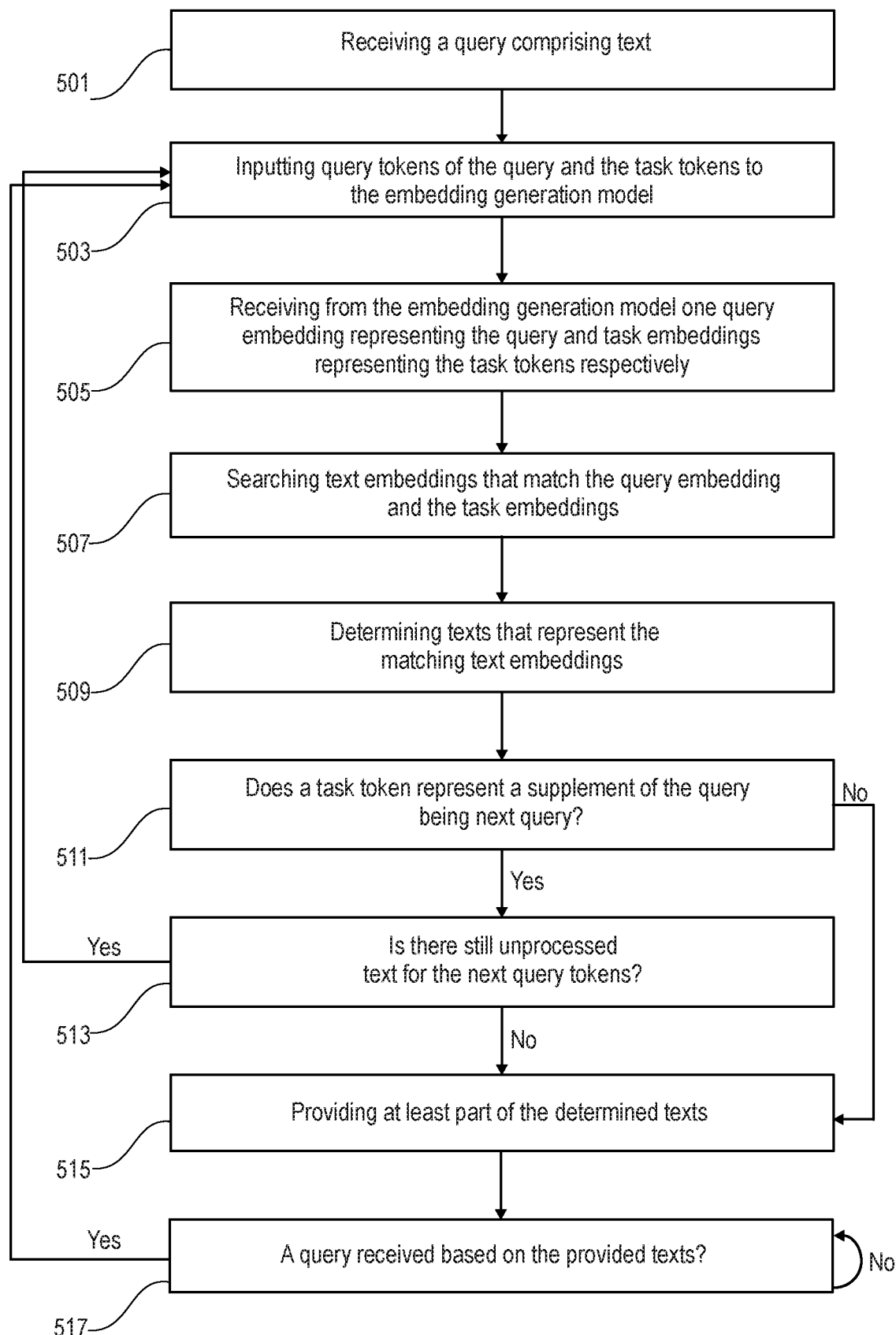
FIG. 6 is a flowchart of a method for information retrieval in accordance with an embodiment of the present invention.

FIG. 6 is a flowchart of a method for information retrieval model in accordance with an embodiment of the present invention. For the purpose of explanation, the method of FIG. 6 may be implemented in the system illustrated in previous FIG. 1 but is not limited to this implementation. The method of FIG. 6 may, for example, be performed by the computer system 101.

Steps 501 to 515 are steps 401 to 415 as described with reference to FIG. 5. In addition, in response to providing the at least part of the determined (e.g., retrieved) texts, the computer system 101 may determine in step 517 whether another query $Q^{l+2}$ is received from the user based on provided texts. Upon receiving the query $Q^{l+2}$, the method steps 503 to 517 may be repeated. The repetition may be performed until a maximum number of repetitions is reached, a maximum processing time is reached, or until it is manually or automatically determined that the underlying need for information is satisfied by the retrieved body of knowledge.

Figure 7:
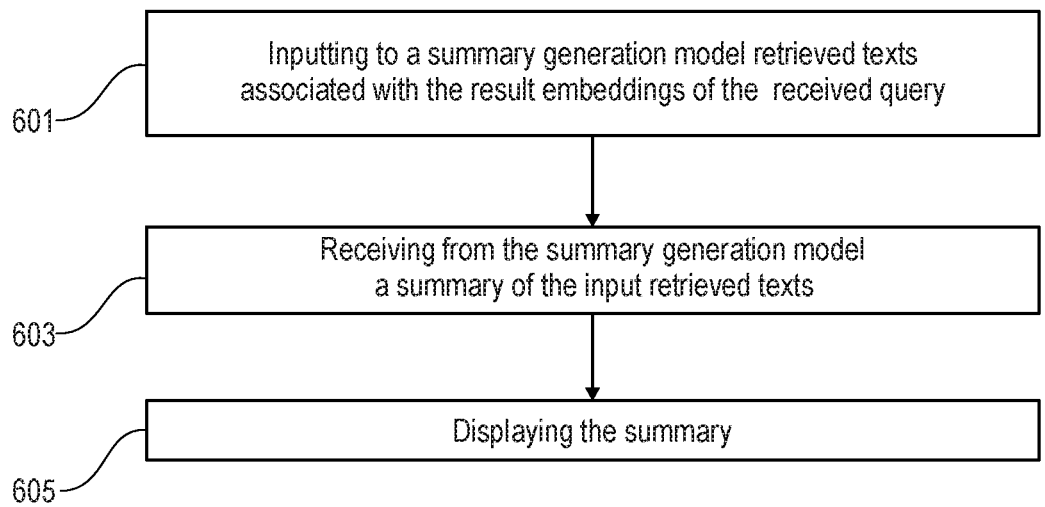
FIG. 7 is a flowchart of a method for providing retrieved information in accordance with an embodiment of the present invention.

FIG. 7 is a flowchart of a method for providing retrieved texts in accordance with an embodiment of the present invention. For the purpose of explanation, the method of FIG. 7 may be implemented in the system illustrated in previous FIG. 1 but is not limited to this implementation. The method of FIG. 7 may, for example, be performed by the computer system 101.

The retrieved texts may be input in step 601 to a summary generation module. Following the example of FIG. 3, all the retrieved ($\Sigma_{j=0}^{N}r_j^1$) texts, $$\text{Text}_1^{E^{Q^1}}, \text{Text}_2^{E^{Q^1}} \ldots \text{Text}_{r_0}^{E^{Q^1}} \text{ and } \text{Text}_1^{E^1_{Taskj}}, \text{Text}_2^{E^1_{Taskj}} \ldots \text{Text}_{r_j}^{E^1_{Taskj}},$$

where j varies between 1 and N may be input to the summary generation module. It may be received in step 603 from the summary generation module a summary of the input retrieved texts. The summary may be displayed in step 605.

Figure 8:
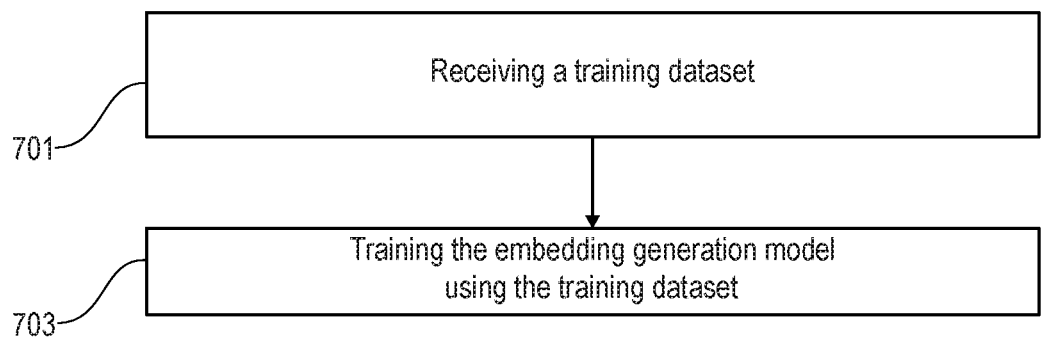
FIG. 8 is a flowchart of a method for training an embedding generation model in accordance with an embodiment of the present invention.

FIG. 8 is a flowchart of a method for training an embedding generation model in accordance with an embodiment of the present invention.

A training dataset may be received in step 701. The training dataset comprises records, wherein each record of the records comprises 2N+1 entries. An entry of the entries comprises an input text representing a query. N other entries of the record comprise second input texts representing N supplements of the query respectively and N remaining entries of the record comprise the N task tokens, respectively. Alternatively, each record of the records comprises N+1 entries, wherein an entry of the entries comprises an input text representing a query and N other entries of the record comprise second input texts representing N supplements of the query, respectively. The N task tokens may, for example, be indicated by the N entries of the second inputs (e.g., by using the sequential information within N). Alternatively, the task tokens may be identified during end-to-end training, manually, by a person for instance via active learning, or automatically, by another model that predicts the task token of an entry text. Alternatively, a sequential training may be performed by, for example, first training a task token classifier and later training the embedding generation model that may partly or fully rely on the task tokens predicted by the task token classifier.

The embedding generation model may be trained in step 703 using as input the records of the training dataset. The embedding generation model may be trained to generate latent representations with the latent representations being embeddings of the query and the N supplements. The training may further comprise the embedding generation model receiving the N task tokens representing the N supplements of the query respectively and the embedding generation model predicting the task embedding of the supplement given the task token and the query. In one example, in order to create the multi-dimensional latent space representation (i.e., the embedding) of a first task token, the embedding generation model may use the other task tokens. For instance, creating an answer embedding could help inform the creation of the next query or next sentence embedding and vice versa. The training may further comprise optimizing the embedding generation model to increase the similarity between the generated task embedding of each task token and the generated embedding of the corresponding supplement of the query.

Figure 9:
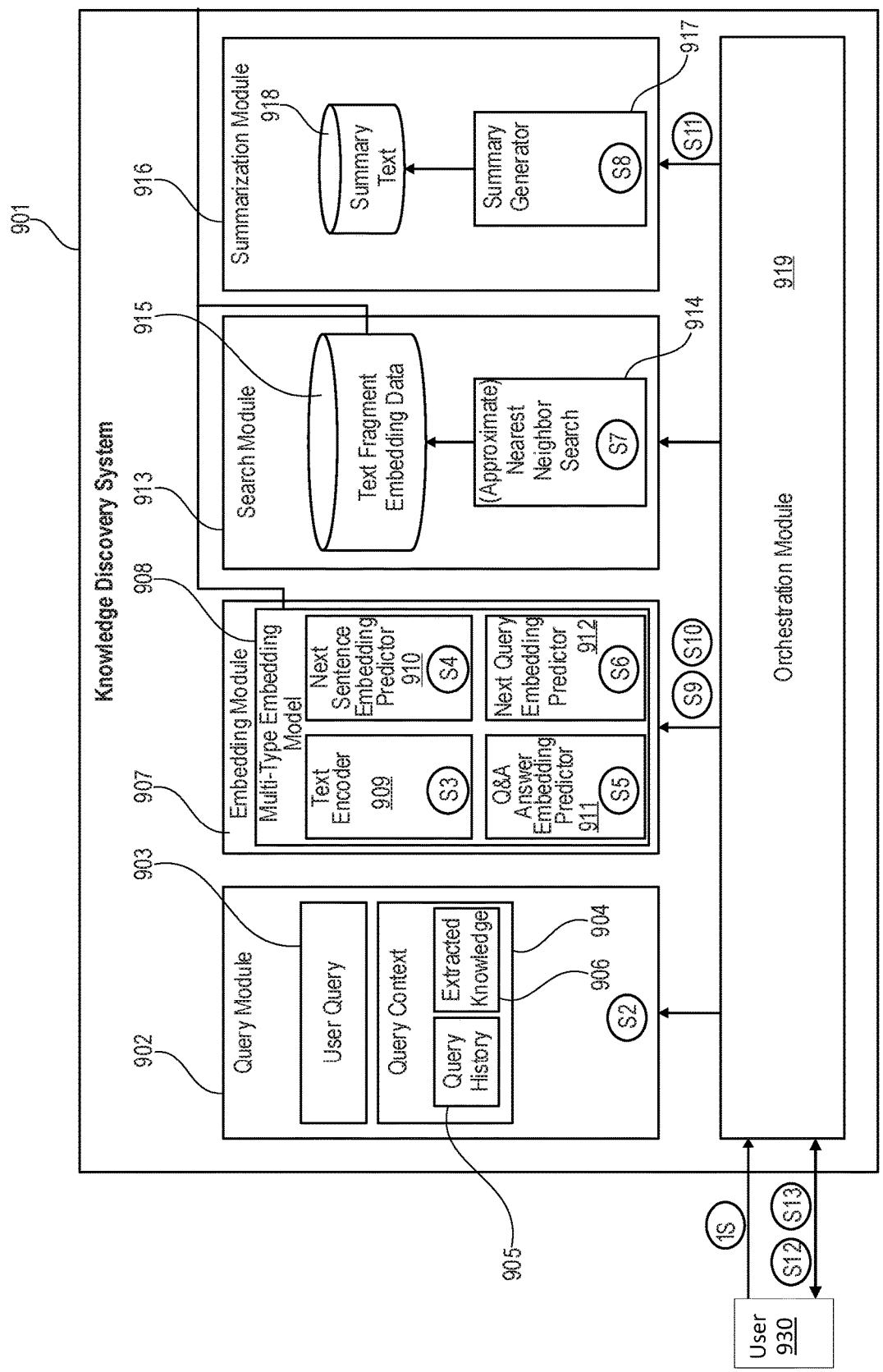
FIG. 9 depicts a diagram of a knowledge discovery system in accordance with an embodiment of the present invention.

FIG. 9 depicts a diagram of a knowledge discovery system 901 in accordance with an embodiment of the present invention. The knowledge discovery system 901 may provide an example implementation of the computer system 101 of FIG. 1.

The knowledge discovery system 901 comprises a query module 902, an embedding module 907, a search module 913, and a summarization module 916. The knowledge discovery system 901 further comprises an orchestration module 919 that may control operation of the query module 902, embedding module 907, search module 913, and summarization module 916.

The query module 902 comprises a user query unit 903 for receiving and optionally preprocessing the query. The user query unit 903 may process the query using query context 904 that comprises a query history 905 and extracted knowledge 906.

The embedding module 907 comprises a multi-type embedding model 908 that is an example of the embedding generation model 107 of FIG. 1. The multi-type embedding model may use more than one task token. For example, the multi-type embedding model 908 may provide only three task tokens, i.e., N=3 for using the multi-type embedding model 908. The three task tokens represent a next sentence embedding predictor 910, an answer embedding predictor 911, and a next query embedding predictor 912. The multi-type embedding model 908 may also enable to provide embeddings for queries using the text encoder 909. For example, the multi-type embedding model 908 may receive as input one query and the three task tokens. The text encoder 909 may determine an embedding for the query. The next sentence embedding predictor 910, the answer embedding predictor 911, and the next query embedding predictor 912 may determine embeddings for the three task tokens respectively.

The search module 913 comprises a nearest neighbor search unit 914 and a data store 915 for text embeddings. The summarization module 916 comprises a summary generator 917 and a storage 918 for storing the summary text.

The operation of the knowledge discovery system 901 may, for example, be described with steps S1 to S13 indicated in the FIG. 9.

As a preparation step, the multi-type model 908 may be trained (e.g., as described with reference to FIGS. 11A-C) with existing data sources for all the four tasks (e.g., using data from SQuAD for Q&A) in order to learn to determine embeddings for the query and the three task tokens using texts of the data sources. This may, for example, be done by connecting to a data source, retrieving text from the data source, separating text into text fragments (e.g., words, word contexts, sentences, chunks, paragraphs, documents, etc.) and embedding each text fragment, storing the embeddings in a text fragment embedding data store 915, initializing nearest neighbor search, and ingesting text fragment embeddings into search index.

In step S1, a user request that contains a query for information may be received from a user 930. In step S2, the user request may be stored, and the user request and query context (e.g., request history, user information) may be pre-processed for further processing. In step S3, a text embedding may be generated for the query by feeding the query text through the multi-type embedding model 908 (inference). The resulting query embedding QE may be extracted and returned to the nearest neighbor search unit 914 for performing step S7. In step S4, which occurs during step S3, a task-specific token (e.g., named [NEXT_SEN]) for next sentence embedding prediction may be fed through the multi-type embedding model. Steps S4 and S3 may, for example, be performed in parallel. The predicted next sentence embedding NSE may be extracted and returned to the nearest neighbor search unit 914 for performing step S7. In step S5, which occurs during step S3, a task-specific token (e.g., named [ANSWER]) for answer embedding prediction is also feed through the multi-type embedding model. Steps S5 and S3 may, for example, be performed in parallel. The predicted answer embedding AE may be extracted and returned to the nearest neighbor search unit 914 for performing step S7. In step S6, which occurs during step S3, a task-specific token (e.g., named [NEXT_QUERY]) for next user query embedding prediction is also feed through the multi-type embedding model. Steps S6 and S3 may, for example, be performed in parallel. The predicted next user query embedding NQE may be extracted and returned to the nearest neighbor search unit 914 for performing step S7. In step S7, for each of the four embeddings [QE, NSE, AE, NQE] a number k (e.g., k=10) of nearest neighbor searches may be performed and the results may be sorted based on distance (e.g., cosine distance). For each result, the associated text is retrieved. In step S8, the QE, NSE, and AE associated text may be added to a summary generator. In step S9, the top 1 texts from the QE may be selected and processed through the multi-type embedding model to retrieve the top k NQE2 texts as in steps S3-S7. In step S10, the top 1 texts from NQE2 may be selected and feed through the multi-type embedding model and the top k AE2 texts may be retrieved as in steps S3-S7. In Step S11, the AE2 associated text may be added to summary generator. In step S12, the texts list of the summary generator may be surfaced to the user 930. In step S13, upon receiving a user feedback (as selection of text to deepen the query) from the user 930, process steps S1-S12 may be repeated.

Figure 10:
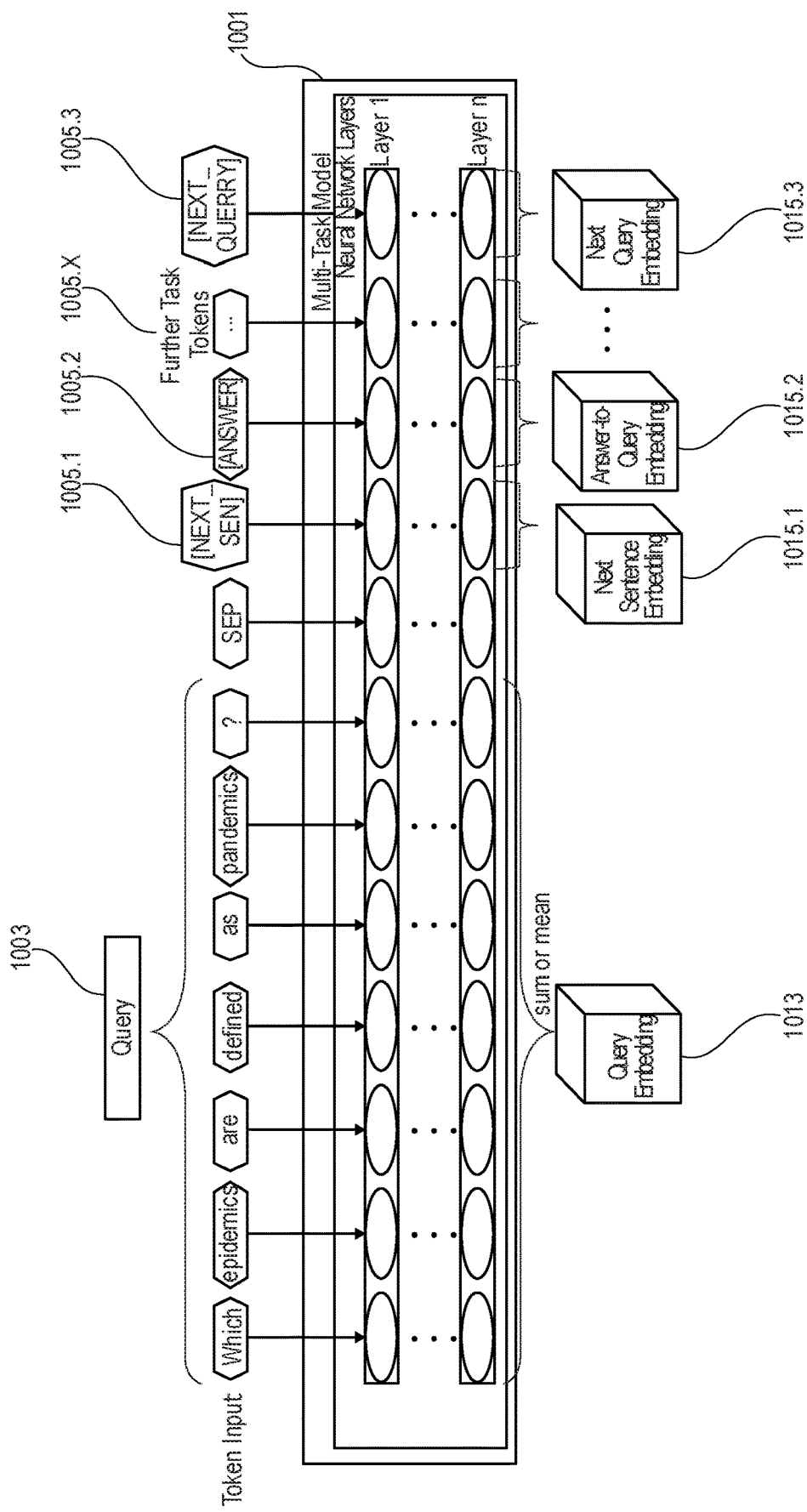
FIG. 10 depicts a diagram of a trained embedding generation model in accordance with an embodiment of the present invention.

FIG. 10 depicts a diagram of a trained embedding generation model in accordance with an embodiment of the present invention. FIG. 10 illustrates a method for the inference of the embedding generation model.

The embedding generation model comprises a multi-task model 1001. The multi-task model 1001 may be a deep neural network comprising layers referred to as Layer 1 to Layer n, with Layer 1 being the input layer and Layer n is the output layer. During inference, the multi-task model 1001 may receive a query 1003 and the three task tokens 1005.1, 1005.2, and 1005.3 as described with reference to FIG. 9. The three task tokens 1005.1, 1005.2, and 1005.3 are named, respectively, [NEXT_SEN], [ANSWER], and [NEXT_QUERY] indicating that they represent the next sentence of the query 1003, the answer to the query 1003, and the next query following the query 1003, respectively. FIG. 10 indicates that the present model is not limited to three task tokens but may receive further task tokens 1005.X. Some examples of further possible tasks may be next paragraph embedding prediction, next word embedding prediction, full summary embedding prediction, expected entity embedding prediction, and domain embedding prediction (e.g., from which type of text does the user want the information to be extracted, e.g., scientific articles or news articles). In the following, only the three tasks 1005.1-3 are considered for simplification of the description. The deep neural network may be provided with a separator node (SEP) that may indicate to the deep neural network the end of the query and start of the task tokens or the separation between the task tokens. Alternatively, a positional encoding may be provided to the deep neural network. The positional encoding signals to the neural network the sequential position of each token in the input.

The query 1003 in the example of FIG. 10 is a question "Which epidemics are defined as pandemics?". This query 1003 is tokenized resulting in input tokens "Which", "epidemics", "are", "defined", "as", "pandemics" and "?". The maximum (string) size of each input token may be variable and depend on the embedding generation model being used. The input tokens and the task tokens may be input to the respective nodes of the input layer Layer 1. This may result in a set of embeddings at the nodes of the output layer Layer n. The set of embeddings comprises query embeddings of the query tokens respectively and task embeddings 1015.1, 1015.2, and 1015.3 of the three task tokens 1005.1, 1005.2, and 1005.3, respectively. As indicated in FIG. 10, the query embeddings may be combined (e.g., summed or averaged) to obtain one query embedding 1013 that represents the query 1003. In one alternative implementation of the inference shown in FIG. 10, during inference, a Siamese architecture (or multiple) neural network encoder models that share the same embedding latent space (e.g., via tied weights) may be used. Benefits of the latter may be parallel processing for each task and higher flexibility of model input length.

Figure 11A:
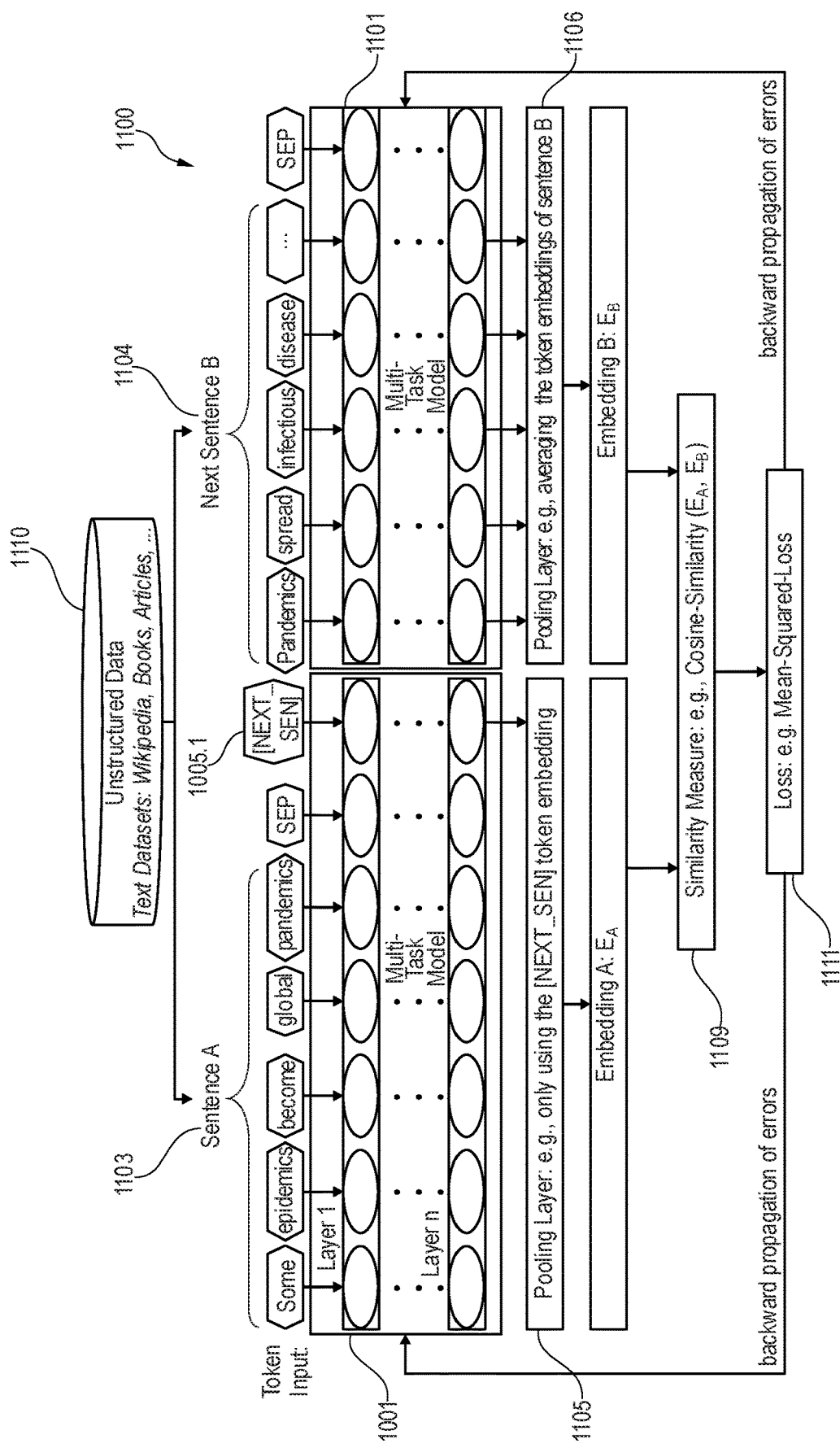
FIG. 11A depicts a diagram illustrating the training of the embedding generation model in accordance with an embodiment of the present invention.
Figure 11B:
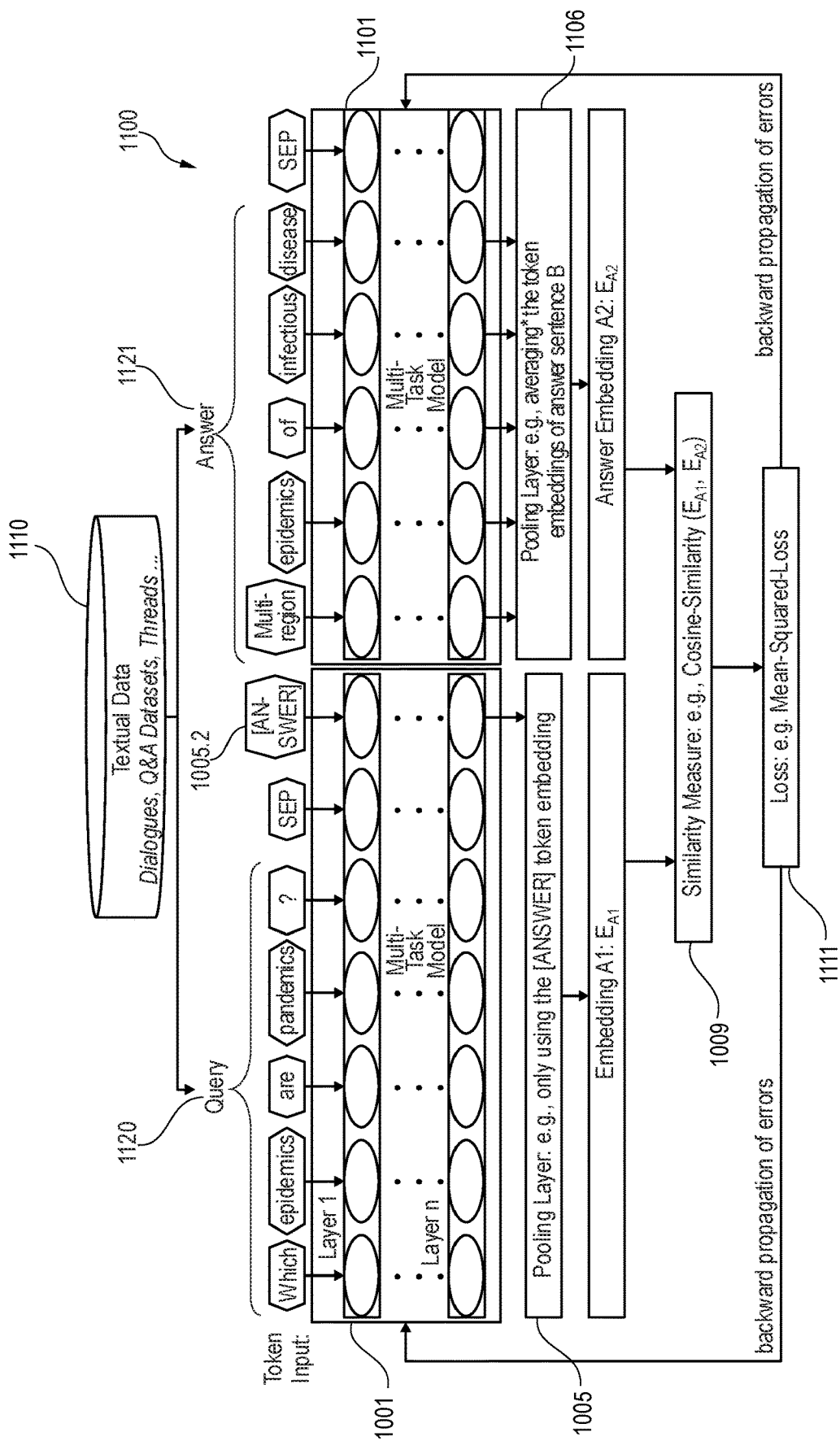
FIG. 11B depicts a diagram illustrating the training of the embedding generation model in accordance with an embodiment of the present invention.
Figure 11C:
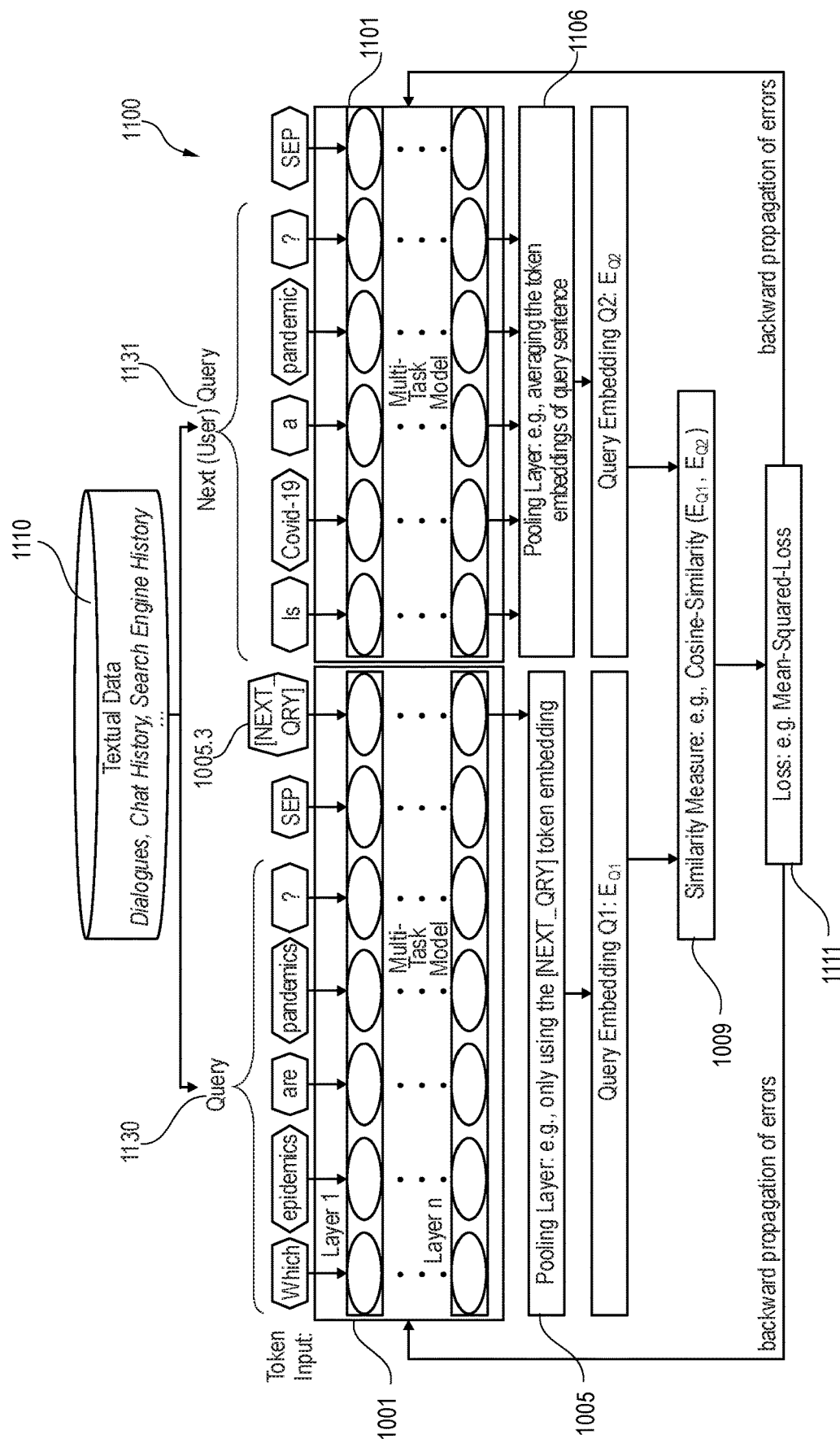
FIG. 11C depicts a diagram illustrating the training of the embedding generation model in accordance with an embodiment of the present invention.

The training of the multi-task model 1001 may be performed in a number N=3 of stages that is equal to the number of task tokens. These three stages are illustrated in FIGS. 11A-C, respectively. FIG. 11A illustrates the training of the multi-task model 1001 to associate the embedding of the task token 1005.1 with the embedding of the next sentence of the query. For that a training infrastructure 1100 is provided. The training infrastructure 1100 comprises the multi-task model 1001 to be trained and another muti-task model 1101. The multi-task model 1001 may receive as input the query and the task token 1005.1 while the other muti-task model 1101 may receive as input the next sentence of the query. The other multi-task model 1101 is a copy of the muti-task model 1001. The muti-task model 1001 is provided with a pooling layer 1105. The muti-task model 1101 is provided with a pooling layer 1106. The training infrastructure 1100 comprises a layer 1109 to measure similarity between embeddings. The training dataset may be obtained from a source of text 1110. The training dataset comprises records, wherein each record comprises a sentence 1103, the task token of interest 1005.1, and a next sentence 1104 of the sentence 1103. The sentence 1103 may be provided as the query for the muti-task model 1001 and sentence 1104 may be provided as the query for the muti-task model 1101. The muti-task model 1001 may further receive the task token 1005.1. The two sentences 1103 and 1104 may be tokenized before inputting the respective query tokens to the associated multi-task models. In response to inputting the sentence 1103 and the task token 1005.1 to the multi-task model 1001, the embeddings associated with the query tokens and the task token 1005.1 may be provided at the output layer Layer n. However, the pooling layer 1005 may only use the embedding E A of the task token 1005.1 to provide it to layer 1009. Similarly, in response to inputting the next sentence 1104 to the multi-task model 1101, the embeddings associated with the query tokens may be provided at the output layer Layer n. The pooling layer 1006 may average the embeddings of the query tokens of the next sentence 1104 to provide the embedding E B that represents the next sentence 1104. The layer 1009 may compute a similarity measure between the two embedding E A and E B and evaluate a loss function 1111 based on the similarity measure. The loss function may be used for backpropagation of errors to the two multi-task models 1001 and 1101 whose parameters may be adapted for a next iteration using another pair of sentences. In one alternative implementation of the training, instead of using Siamese architecture, only one copy of the model that sequentially provides embeddings E A and E B may be used.

FIG. 11B illustrates the training of the multi-task model 1001 to associate the embedding of the task token 1005.2 with the embedding of the answer of the query. The training infrastructure 1100 comprises the multi-task model 1001 to be trained and another muti-task model 1101. The multi-task model 1001 may receive as input the query and the task token 1005.2 while the other muti-task model 1101 may receive as input the answer of the query. The training dataset may be obtained from the source of text 1110. The training dataset comprises records, wherein each record comprises a question 1120, the task token of interest 1005.2, and an answer 1121 to the question 1120. The question 1120 may be provided as the query for the muti-task model 1001 and answer 1121 may be provided as the query for the muti-task model 1101. The muti-task model 1001 may further receive the task token 1005.2. The question 1120 and the answer 1121 may be tokenized before inputting the respective query tokens to the associated multi-task models. In response to inputting the question 1120 and the task token 1005.2 to the multi-task model 1001, the embeddings associated with the query tokens and the task token 1005.2 may be provided at the output layer Layer n. However, the pooling layer 1005 may only use the embedding E A1 of the task token 1005.2 to provide it to layer 1009. Similarly, in response to inputting the answer 1121 to the multi-task model 1101, the embeddings associated with the query tokens may be provided at the output layer Layer n. The pooling layer 1006 may average the embeddings of the query tokens of the answer 1121 to provide the embedding E A2 that represents the answer 1121. The layer 1009 may compute a similarity measure between the two embedding E A1 and E A2 and evaluate a loss function 1111 based on the similarity measure. The loss function may be used for backpropagation of errors to the two multi-task models 1001 and 1101 whose parameters may be adapted for a next iteration using another pair of question-answer.

FIG. 11C illustrates the training of the multi-task model 1001 to associate the embedding of the task token 1005.3 with the embedding of the next query of the query. The training infrastructure 1100 comprises the multi-task model 1001 to be trained and another multi-task model 1101. The multi-task model 1001 may receive as input the query and the task token 1005.3 while the other muti-task model 1101 may receive as input the next query. The training dataset may be obtained from the source of text 1110. The training dataset comprises records, wherein each record comprises a query 1130, the task token of interest 1005.3, and a next query 1131 subsequent to the query 1130. The query 1130 may be provided as the query for the muti-task model 1001 and next query 1131 may be provided as the query for the muti-task model 1101. The muti-task model 1001 may further receive the task token 1005.3. The query 1130 and the next query 1131 may be tokenized before inputting the respective query tokens to the associated multi-task models. In response to inputting the query 1130 and the task token 1005.3 to the multi-task model 1001, the embeddings associated with the query tokens and the task token 1005.3 may be provided at the output layer Layer n. However, the pooling layer 1005 may only use the embedding $E_{Q1}$ of the task token 1005.3 to provide it to layer 1009. Similarly, in response to inputting the next query 1131 to the multi-task model 1101, the embeddings associated with the query tokens may be provided at the output layer Layer n. The pooling layer 1006 may average the embeddings of the query tokens of the next query 1131 to provide the embedding $E_{Q2}$ that represents the next query 1131. The layer 1009 may compute a similarity measure between the two embeddings $E_{Q1}$ and $E_{Q2}$ and evaluate a loss function 1111 based on the similarity measure. The loss function may be used for backpropagation of errors to the two multi-task models 1001 and 1101 whose parameters may be adapted for a next iteration using another pair of question-next query.

Figure 12:
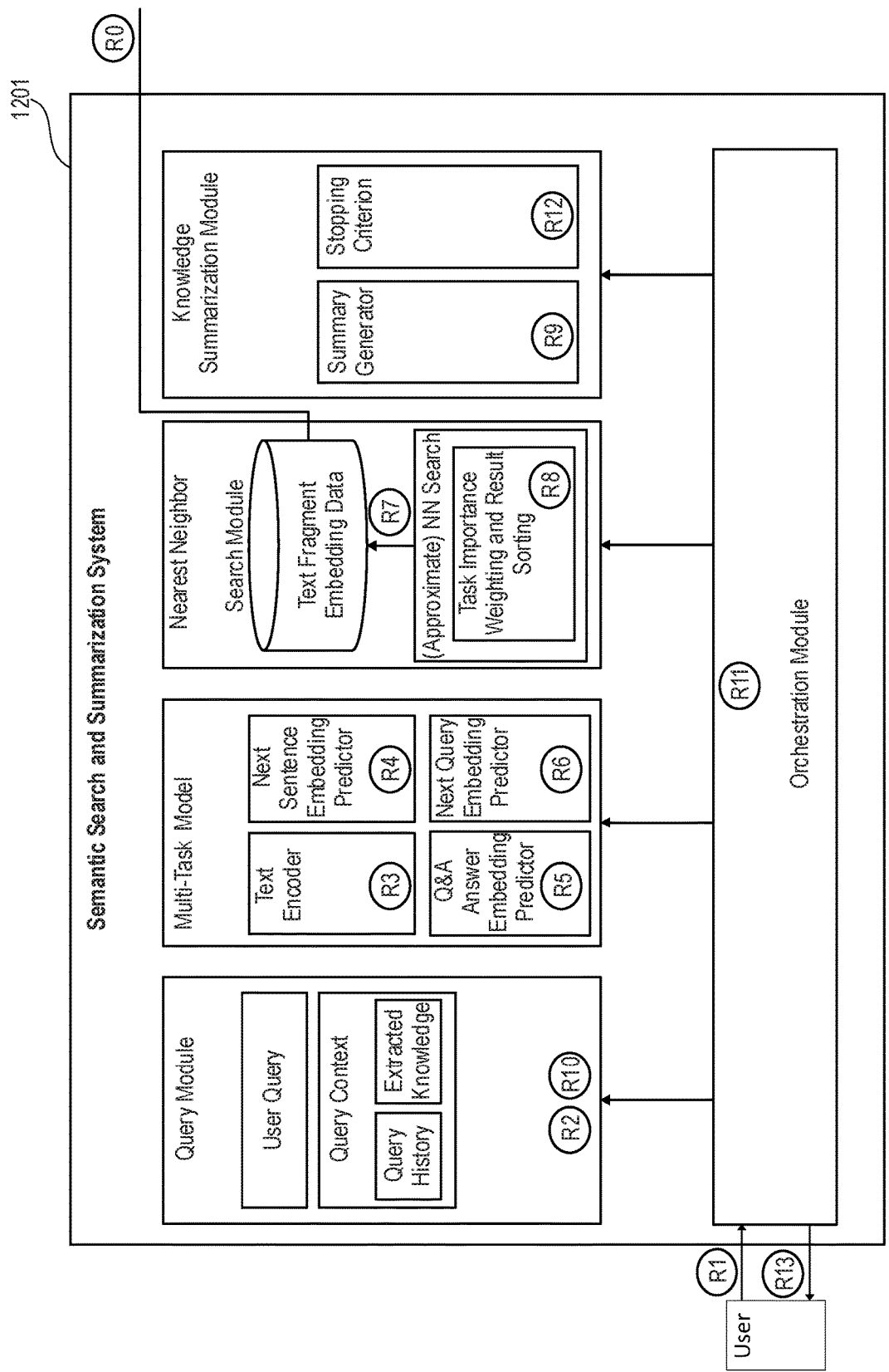
FIG. 12 depicts a diagram of a knowledge discovery system in accordance with an embodiment of the present invention.

FIG. 12 depicts a diagram of a knowledge discovery system 1201 in accordance with embodiment of the present invention. The knowledge discovery system 1201 may provide an example implementation of the computer system 101 of FIG. 1. The knowledge discovery system 1201 is similar to the knowledge discovery system 901 of FIG. 9, except that FIG. 12 illustrates another method having steps R0 to R13 that may be different from the method illustrated in FIG. 9.

In step R0, the knowledge discovery system 1201 may connect to a data source, retrieve text from data source, separate text into text fragments (e.g., words, word contexts, sentences, chunks, paragraphs, documents, etc.) and embed each text fragment, store the embeddings in a text fragment embedding data store, initialize nearest neighbor search, and ingest text fragment embeddings into search index. In one example, step R0 may repeatedly be executed to provide up-to-date text embeddings that represent current content of the data sources. The repetition may, for example, be performed on a periodic basis. In one example, step R0 may be executed in response to a user request that is received at the knowledge discovery system 1201.

In step R1, a user request that contains a query for information may be received from a user. In step R2, the user request may be stored, and the user request and query context (i.e., request history, user information) may be pre-processed for further processing. In step R3, a text embedding of the query may be generated by feeding the query text through the multi-task model (inference). The query embedding may be extracted and returned to the nearest neighbor search unit for performing step R7. In step R4, which occurs during step R3, a task-specific token (e.g., [NEXT_SEN]) for next sentence embedding prediction is also feed through the multi-task model. Steps R4 and R3 may, for example, be performed in parallel. The predicted next sentence embedding may be extracted and returned to the nearest neighbor search unit for performing step R7. In step R5, which occurs during step R3, a task-specific token (e.g., [ANSWER]) for answer embedding prediction is also feed through the multi-task model. Steps R5 and R3 may, for example, be performed in parallel. The predicted answer embedding is extracted and returned to the nearest neighbor search unit for performing step R7. In step R6, which occurs during step R3, a task-specific token (e.g., [NEXT_QUERY]) for next user query embedding prediction is also feed through the multi-task model. Steps R6 and R3 may, for example, be performed in parallel. The predicted next user query embedding may be extracted and returned to the nearest neighbor search unit for performing step R7. In step R7, an (approximate) nearest neighbor search for each of the four retrieved search embeddings (retrieved in steps (R3) to (R6)) may be performed separately e.g., in parallel. A set of nearest neighbor embeddings each being associated with a similarity score to their respective search embedding may be retrieved.

Alternatively, in step R7 instead of searching for all four retrieved task-specific search embeddings separately, one may merge at least part of the four task-specific search embeddings (e.g., merging all of the four task-specific search embeddings) by averaging, addition, concatenation, weighted averaging (e.g., by respective task importance), etc. and executing the search for the resulting embeddings after the merging is performed.

In step R8, a score may be assigned to the retrieved documents by computing the similarity of each of them to each of the four task-specific search embeddings (from (R3)-(R6)). Based on this score, an arbitrary number of retrieved text fragments are selected for summarization, where the arbitrary number of text fragments may be a randomly selected number of text fragments from the retrieved text fragments. The score can be weighted statically or dynamically across iterations (e.g., as a text most similar to the query embedding was selected in iteration i, a text more similar to the answer embedding could be weighted more strongly in iteration i+1).

In step R9, an ordered set of candidate text fragments as input into the summary generator may be retrieved and the summary generator appends text to a summary-in-preparation.

In step R10, the extracted knowledge of the query context may be updated with the new version of the summary-in-preparation, which, for instance, may be relevant to token embedding prediction such as the next sentence embedding prediction in the next iteration. This may particularly be advantageous if the extracted knowledge or part thereof (or the summary-in-preparation) is input into the model in the next iteration. In step R11, the steps R1-R10 may be repeated iteratively. During these steps, intermediate summary-in-preparation and/or search results may be progressively displayed to the user. The user may at this point interact with the system to steer the summary generation process in the right direction (e.g., by selecting most useful text parts, query reformulation, discarding parts of the summary, etc., to update the system, e.g., by adjusting the query context and search result weighting).

In step R12, a stopping criterion may be reached. This criterion can be based on summary length, embedding similarity thresholds, processing time passed, user interaction, etc. In step R13, the final summary may be generated and returned to the user.

Figure 13:
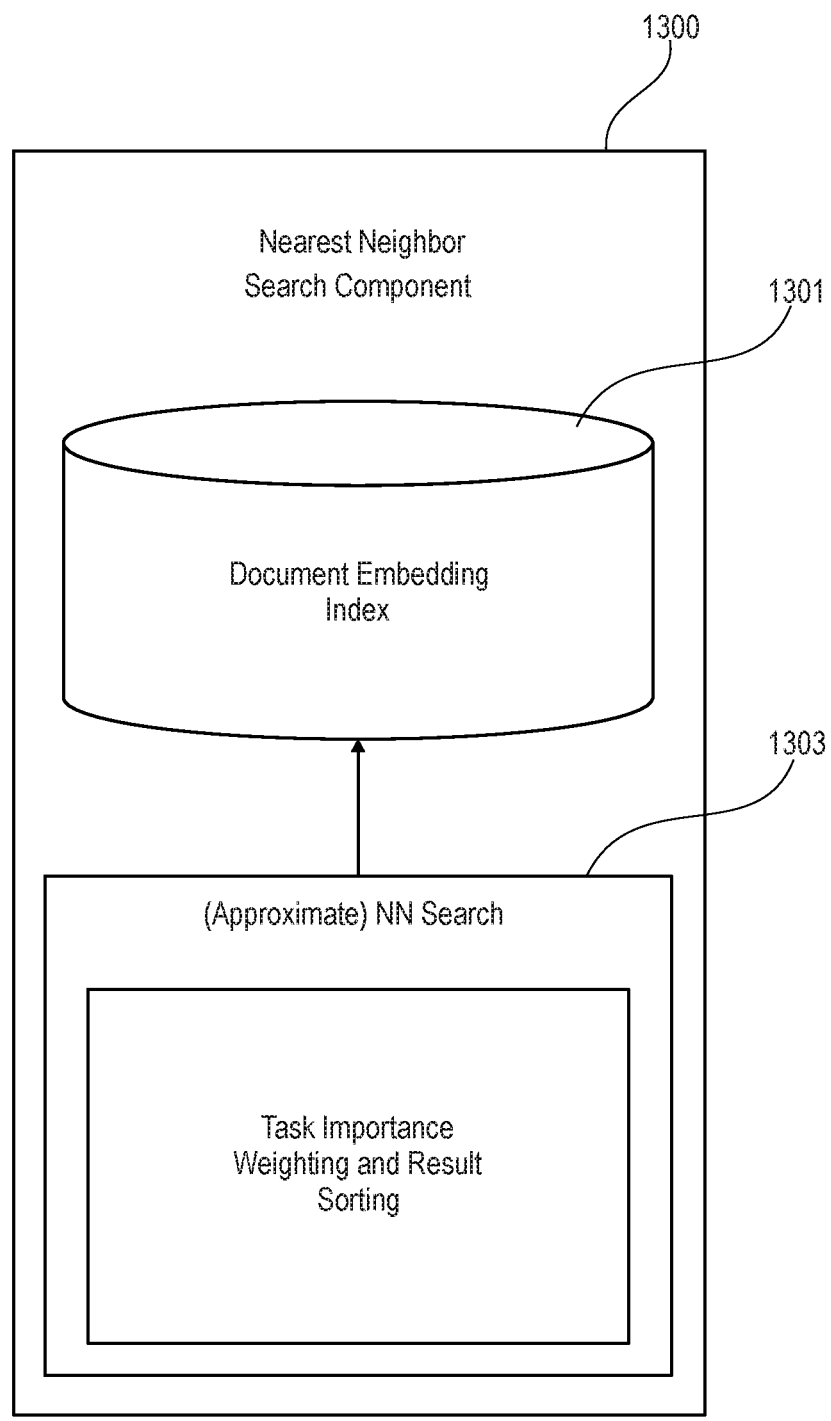
FIG. 13 depicts a diagram of a nearest neighbor search component in accordance with an embodiment of the present invention.

FIG. 13 depicts a nearest neighbor search component 1300 according to an embodiment of the present invention. The nearest neighbor search component 1300 may enable to search text embeddings that match a given generated embedding. The nearest neighbor search component 1300 may comprise a document embedding index 1301 and a search engine 1303. An approximate nearest neighbor search may be performed for each of the retrieved search embeddings (retrieved in steps (R3) to (R6) of FIG. 12) separately. A set of nearest neighbor embeddings each being associated with a similarity score to their respective search embedding may be retrieved. A score may be assigned to the retrieved documents by computing the similarity of each of them to each of the four task-specific search embeddings (from (R3)-(R6) of FIG. 12). Based on this score, an arbitrary number of retrieved text fragments are selected for summarization. The score can be weighted statically or dynamically across iterations (e.g., as a text most similar to the query embedding was selected in iteration i, a text more similar to the answer embedding could be weighted more strongly in iteration i+1).

Figure 14:
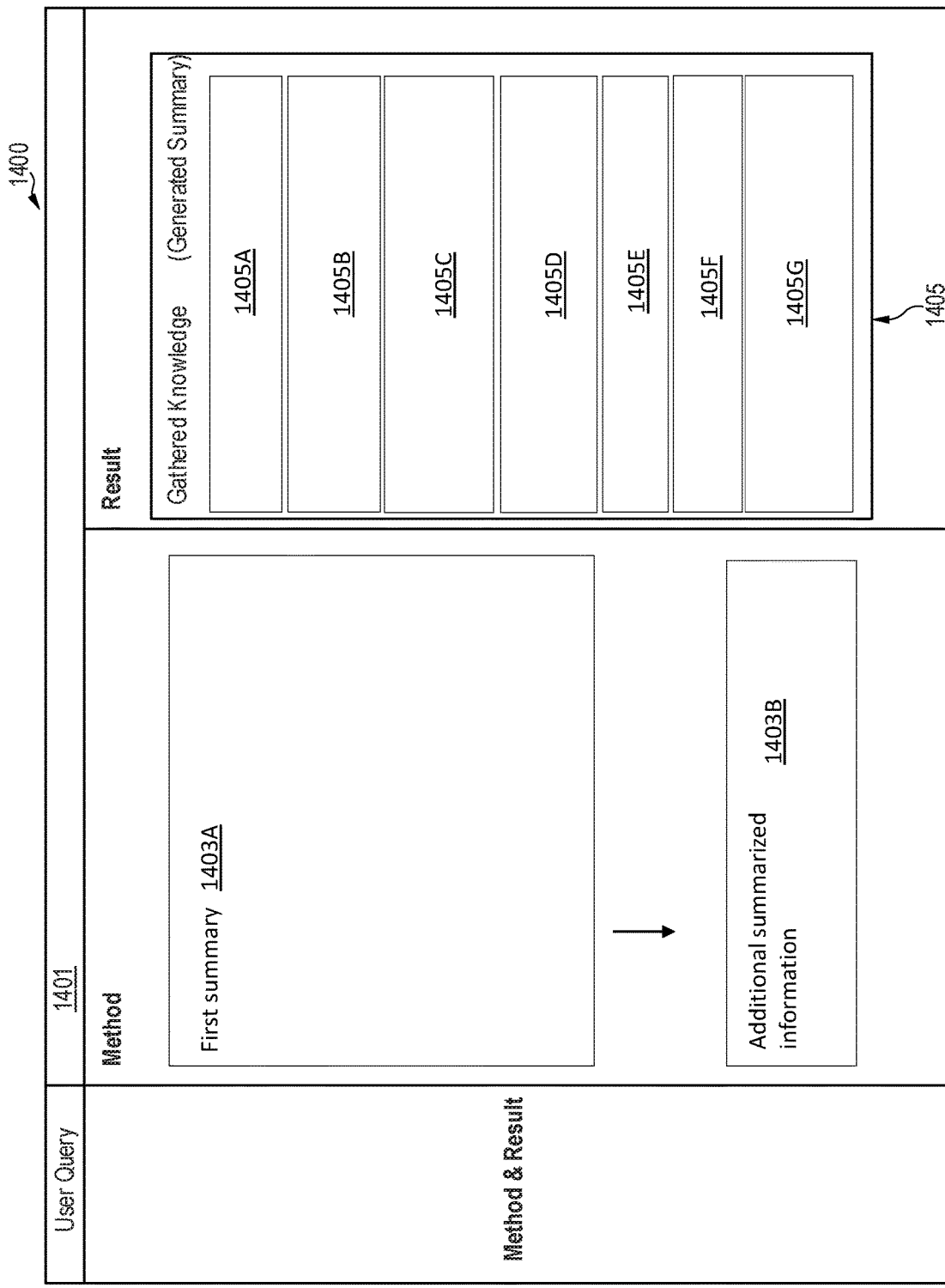
FIG. 14 shows an example search result in accordance with an embodiment of the present invention.

FIG. 14 illustrates results of an example application of the present information retrieval method. FIG. 14 illustrates the value of the present method for summarization applications or search applications. The input of the application and its results may, for example, be displayed in a user interface 1400.

In this example, the number N of task tokens used in the inference is equal to three N=3, the answer token, the next query token, and the next sentence token. In addition, the method is executed two times. In the second execution of the method, the number of task tokens used is N=1, which is the answer token. The query used in the first execution of the method is "How to present information in a computer?". The query used in the second execution method is a text (QE2) retrieved for the next query token in the first iteration.

A simple illustration dataset may be used. This dataset consists of an example textual content of six search results retrieved from simple web searches using the query 1401 "How to present information in a computer?", the query "How to organize the information using the UML?", and the query "using the ArgoUML tool". These consecutive search queries are chosen to exemplify the method's iterative query generation approach. The text from the search result web pages is pre-processed (e.g., replacing special characters) and concatenated into a single text. For example, after inferencing the model with the user query, the following first summary 1403A is retrieved and displayed in block 1403 of the user interface 1400. The first summary 1403A comprises the text portion of the query embedding: "How to structure your information in an optimal manner" (QE). The first summary 1403A further comprises the text portion of the answer embedding: "A modeling language can be used to express information or knowledge or systems in a structure that is defined by a consistent set of rules" (AE). The first summary 1403A further comprises the text portion of the next sentence embedding: "The Unified Modeling Language (UML) is an example modeling language in the field of software engineering" (NSE). The first summary 1403A further comprises the text portion of the next query embedding: "How to organize the information using the UML" (QE2). The first summary 1403A further comprises the text portion of the answer embedding of the next query embedding: "We will be using the ArgoUML tool for the organization of the information." (AE2). The first summary consists of text (i.e., indexed from simple search result dataset) comprising query embedding (QE) text retrieved from a source source_y1.science, answer embedding (AE) text retrieved from a source source_y2.com, next sentence embedding (NSE) text retrieved from a source source_y2.com, next QE (QE2) text retrieved from a source source_y3.com, and text (AE2) answering QE2 retrieved from a source source_y3.com. The first summary 1403A is surfaced to the user. The user selects part of the first summary 1403A (e.g., "using the ArgoUML tool") to indicate an additional information need. Accordingly, the following additional summarized information 1403B is provided using the model. The additional summarized information 1403B comprises the text portion of a query embedding: "using the ArgoUML tool" (QE), and the text portion of an answer embedding: "ArgoUML is an UML diagramming application written in Java. By virtue of being a Java application, it is available on any platform supported by Java SE." (AE).

In order to construct the final summary, the additional summarized information 1403B is added to the first summary 1403A providing a concise result likely satisfying the user information need. The final summary is shown in block 1405 in FIG. 14. The final summary lists the queries and search results. The final summary comprises a text portion 1405A: "How to structure Your information in an optimal manner". The final summary further comprises a text portion 1405B: "A modeling language can be used to express information or knowledge or systems in a structure that is defined by a consistent set of rules". The final summary further comprises a text portion 1405C: "The Unified Modeling Language (UML) is an example modeling language in the field of software engineering.". The final summary further comprises a text portion 1405D: "How to organize the information using the UML". The final summary further comprises a text portion 1405E: "We will be using the ArgoUML tool for the organization of the information.". The final summary further comprises a text portion 1405F: "Using the ArgoUML tool". The final summary further comprises a text portion 1405G: "ArgoUML is an UML diagramming application written in Java. By virtue of being a Java application, it is available on any platform supported by Java SE.".

A computer implemented method for querying a data source represented by data object embeddings in a vector space, the method comprising: receiving a query comprising a data object; inputting, to a trained embedding generation model, the received query and at least one token for receiving from the trained embedding generation model a set of embeddings of the vector space, the set of embeddings comprising an embedding of the received query and at least one embedding of the at least one token respectively, wherein the embedding of each token is a prediction of an embedding of a supplement of the query; searching, in the data object embeddings, data object embeddings that match the set of embeddings, resulting in data object embedding, referred to as search result embeddings, of the set of embeddings; determining data objects that are represented by the search result embeddings; providing at least part of the determined data objects.

In some embodiments, the supplement of the query being any one of: a next query subsequent to the query, an answer of the query, a next sentence of the query, a previous query preceding the query, a next paragraph of the query, a previous paragraph of the query, a next word of the query, a summary of the query, a translation of the query, a paraphrased text of the query, an entity related to the query, a type of the entity, a domain of the query, a numerical value related to the query, a temporal value related to the query, a profile related to the query, a location related to the query, a media file related to the query, an extended query, a query history, a previous answer, an answer history, actions related to an environment, a labelling, and a set of labels.

In some embodiments, the data object comprising at least one of: text, sound data, programming code, video data, tabular data, time-series data, longitudinal data and image data.

In some embodiments, determining the data objects which are represented by the search result embedding comprising: retrieving said data objects from the data source and/or generating said data objects using the search result embeddings.

In some embodiments, the at least one token representing a next query subsequent to the query, an answer of the query or a next sentence of the query.

In some embodiments, the at least one token being a token representing a prediction of a next query of the received query, the method further comprising: repeating the inputting, the searching and the retrieving using in each repetition as a query a distinct retrieved data object for the embedding of the token.

In some embodiments, the method further comprising: ranking the retrieved data objects of the search result embeddings associated with the token selecting the first k ranked determined data objects, wherein the repetition is performed for the k ranked data objects.

In some embodiments, the at least one token comprising a token representing a prediction of a next query of the received query and a prediction of an answer of the received query.

In some embodiments, the searching comprising: combining the set of embeddings, resulting in a combined embedding and searching, in the data objects embeddings, data object embeddings that match the combined embedding.

In some embodiments, wherein the searching is performed using a nearest neighbor search fork data object embeddings, where k≥1, for each of the set of embeddings.

In some embodiments, the method further comprising: for each embedding of the set of embeddings: computing similarity scores between the each embedding and the corresponding search result embeddings; ranking based on the similarity scores the determine data objects corresponding to the each embedding: selecting a subset of the determined data objects based on the ranking; wherein the at least part of the determined objects comprises the selected subsets.

In some embodiments, wherein providing the at least part of the determined data objects comprises: inputting to a summary generation module determined data objects associated with the result embeddings of the received query; receiving from the summary generation module a summary of the input determined data objects, the at least part of the determined data objects comprising the summary; displaying the summary.

In some embodiments, the method further comprising: in response to providing the determined data objects, receiving another query, and repeating the method for the other query.

In some embodiments, the at least one token comprising a number N of tokens, N≥1, the method further comprising: before receiving the query training the embedding generation model comprising: receiving a training dataset comprising records, wherein each record of the records comprises at least N+1 entries, an entry of the entries comprising an input data object representing a query, the at least N other entries of the record indicating second input data objects representing N supplements of the query and the N tokens; training the embedding generation model using as input the records of the training dataset, wherein the training is performed such that the similarity between a generated embedding of each second input data object and an embedding generated for the associated token is optimized.

In some embodiments, the data source comprising multiple document sources.

In some embodiments, the embedding generation model being a multi-task learning model having as tasks generation of the embeddings for the query and for the at least one token.

In some embodiments, the embedding generation model being a deep neural network, comprising a number of nodes in an input layer greater or equal to the number of query tokens of the query plus the number of the at least one token.

Figure 15:
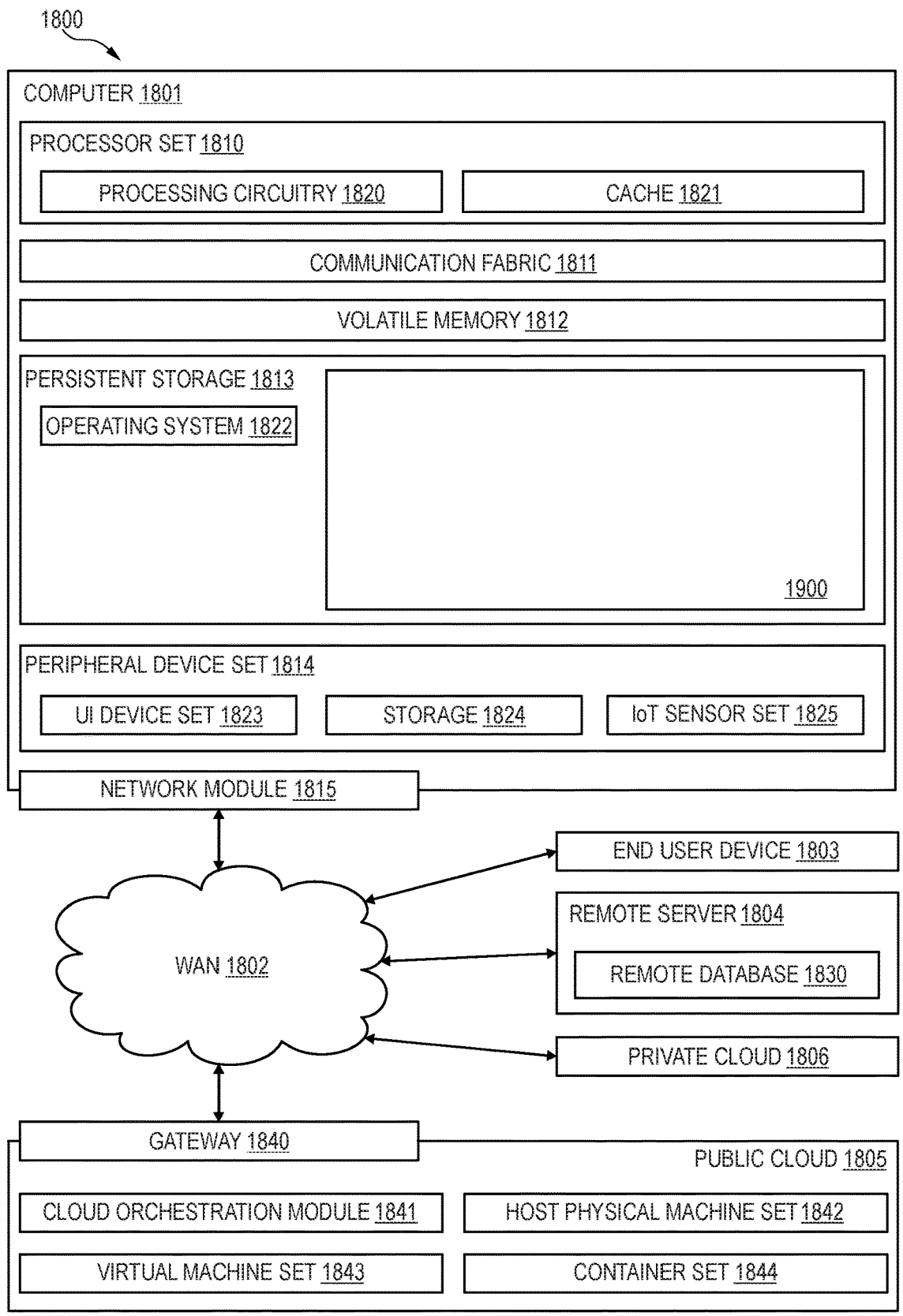
FIG. 15 is a computing environment in accordance with an embodiment of the present invention.

In FIG. 15, computing environment 1800 contains an example of an environment for the execution of at least some of the computer code involved in performing the inventive methods, such as improved embedding-based information retrieval code 1900. In addition to block 1900, computing environment 1800 includes, for example, computer 1801, wide area network (WAN) 1802, end user device (EUD) 1803, remote server 1804, public cloud 1805, and private cloud 1806. In this embodiment, computer 1801 includes processor set 1810 (including processing circuitry 1820 and cache 1821), communication fabric 1811, volatile memory 1812, persistent storage 1813 (including operating system 1822 and block 1900, as identified above), peripheral device set 1814 (including user interface (UI), device set 1823, storage 1824, and Internet of Things (IoT) sensor set 1825), and network module 1815. Remote server 1804 includes remote database 1830. Public cloud 1805 includes gateway 1840, cloud orchestration module 1841, host physical machine set 1842, virtual machine set 1843, and container set 1844.

COMPUTER 1801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1830. As is well understood in the art of computer technology, and depending upon the technology, performance of a computer-implemented method may be distributed among multiple computers and/or between multiple locations. On the other hand, in this presentation of computing environment 1800, detailed discussion is focused on a single computer, specifically computer 1801, to keep the presentation as simple as possible. Computer 1801 may be located in a cloud, even though it is not shown in a cloud in FIG. 15. On the other hand, computer 1801 is not required to be in a cloud except to any extent as may be affirmatively indicated.

PROCESSOR SET 1810 includes one, or more, computer processors of any type now known or to be developed in the future. Processing circuitry 1820 may be distributed over multiple packages, for example, multiple, coordinated integrated circuit chips. Processing circuitry 1820 may implement multiple processor threads and/or multiple processor cores. Cache 1821 is memory that is located in the processor chip package(s) and is typically used for data or code that should be available for rapid access by the threads or cores running on processor set 1810. Cache memories are typically organized into multiple levels depending upon relative proximity to the processing circuitry. Alternatively, some, or all, of the cache for the processor set may be located "off chip." In some computing environments, processor set 1810 may be designed for working with qubits and performing quantum computing.

Computer readable program instructions are typically loaded onto computer 1801 to cause a series of operational steps to be performed by processor set 1810 of computer 1801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1821 and the other storage media discussed below. The program instructions, and associated data, are accessed by processor set 1810 to control and direct performance of the inventive methods. In computing environment 1800, at least some of the instructions for performing the inventive methods may be stored in block 1900 in persistent storage 1813.

COMMUNICATION FABRIC 1811 is the signal conduction paths that allow the various components of computer 1801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1812 is any type of volatile memory now known or to be developed in the future. Examples include dynamic type random access memory (RAM) or static type RAM. Typically, the volatile memory is characterized by random access, but this is not required unless affirmatively indicated. In computer 1801, the volatile memory 1812 is located in a single package and is internal to computer 1801, but, alternatively or additionally, the volatile memory may be distributed over multiple packages and/or located externally with respect to computer 1801.

PERSISTENT STORAGE 1813 is any form of non-volatile storage for computers that is now known or to be developed in the future. The non-volatility of this storage means that the stored data is maintained regardless of whether power is being supplied to computer 1801 and/or directly to persistent storage 1813. Persistent storage 1813 may be a read only memory (ROM), but typically at least a portion of the persistent storage allows writing of data, deletion of data and re-writing of data. Some familiar forms of persistent storage include magnetic disks and solid state storage devices. Operating system 1822 may take several forms, such as various known proprietary operating systems or open source Portable Operating System Interface type operating systems that employ a kernel. The code included in block 1900 typically includes at least some of the computer code involved in performing the inventive methods.

PERIPHERAL DEVICE SET 1814 includes the set of peripheral devices of computer 1801. Data communication connections between the peripheral devices and the other components of computer 1801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1823 may include components such as a display screen, speaker, microphone, wearable devices (such as goggles and smart watches), keyboard, mouse, printer, touchpad, game controllers, and haptic devices. Storage 1824 is external storage, such as an external hard drive, or insertable storage, such as an SD card. Storage 1824 may be persistent and/or volatile. In some embodiments, storage 1824 may take the form of a quantum computing storage device for storing data in the form of qubits. In embodiments where computer 1801 is required to have a large amount of storage (for example, where computer 1801 locally stores and manages a large database) then this storage may be provided by peripheral storage devices designed for storing very large amounts of data, such as a storage area network (SAN) that is shared by multiple, geographically distributed computers. IoT sensor set 1825 is made up of sensors that can be used in Internet of Things applications. For example, one sensor may be a thermometer and another sensor may be a motion detector.

NETWORK MODULE 1815 is the collection of computer software, hardware, and firmware that allows computer 1801 to communicate with other computers through WAN 1802. Network module 1815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1815 are performed on the same physical hardware device. In other embodiments (for example, embodiments that utilize software-defined networking (SDN)), the control functions and the forwarding functions of network module 1815 are performed on physically separate devices, such that the control functions manage several different network hardware devices. Computer readable program instructions for performing the inventive methods can typically be downloaded to computer 1801 from an external computer or external storage device through a network adapter card or network interface included in network module 1815.

WAN 1802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1803 is any computer system that is used and controlled by an end user (for example, a customer of an enterprise that operates computer 1801), and may take any of the forms discussed above in connection with computer 1801. EUD 1803 typically receives helpful and useful data from the operations of computer 1801. For example, in a hypothetical case where computer 1801 is designed to provide a recommendation to an end user, this recommendation would typically be communicated from network module 1815 of computer 1801 through WAN 1802 to EUD 1803. In this way, EUD 1803 can display, or otherwise present, the recommendation to an end user. In some embodiments, EUD 1803 may be a client device, such as thin client, heavy client, mainframe computer, desktop computer and so on.

REMOTE SERVER 1804 is any computer system that serves at least some data and/or functionality to computer 1801. Remote server 1804 may be controlled and used by the same entity that operates computer 1801. Remote server 1804 represents the machine(s) that collect and store helpful and useful data for use by other computers, such as computer 1801. For example, in a hypothetical case where computer 1801 is designed and programmed to provide a recommendation based on historical data, then this historical data may be provided to computer 1801 from remote database 1830 of remote server 1804.

PUBLIC CLOUD 1805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1805 is performed by the computer hardware and/or software of cloud orchestration module 1841. The computing resources provided by public cloud 1805 are typically implemented by virtual computing environments that run on various computers making up the computers of host physical machine set 1842, which is the universe of physical computers in and/or available to public cloud 1805. The virtual computing environments (VCEs) typically take the form of virtual machines from virtual machine set 1843 and/or containers from container set 1844. It is understood that these VCEs may be stored as images and may be transferred among and between the various physical machine hosts, either as images or after instantiation of the VCE. Cloud orchestration module 1841 manages the transfer and storage of images, deploys new instantiations of VCEs and manages active instantiations of VCE deployments. Gateway 1840 is the collection of computer software, hardware, and firmware that allows public cloud 1805 to communicate through WAN 1802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1806 is similar to public cloud 1805, except that the computing resources are only available for use by a single enterprise. While private cloud 1806 is depicted as being in communication with WAN 1802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1805 and private cloud 1806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A computer implemented method for querying a data source represented by data object embeddings in a vector space, the method comprising:
   receiving a query comprising a data object;
   separating the query into one or more query tokens;
   identifying one or more task tokens from a pre-defined list of task tokens, wherein the one or more task tokens each represent a prediction of a supplement of the query;
   inputting, to a trained embedding generation model, the one or more query tokens and the one or more task tokens for receiving from the trained embedding generation model a set of embeddings of the vector space, the set of embeddings comprising an embedding of the query and an embedding of each of the one or more task tokens;
   searching, in the data object embeddings, for a subset of the data object embeddings that match the set of embeddings, resulting in search result embeddings;
   determining data objects that are represented by the search result embeddings;
   determining additional data objects using, as a new query, a particular data object retrieved for the embedding of a task token of the one or more task tokens; and
   providing at least part of the determined data objects and the additional data objects.

2. The method of claim 1, the data object comprising at least one of: text, sound data, programming code, video data, tabular data, time-series data, longitudinal data, and image data.

3. The method of claim 1, wherein the determining the data objects that are represented by the search result embeddings comprises at least one of: retrieving the data objects from the data source and generating the data objects using the search result embeddings.

4. The method of claim 1, wherein the supplement comprises at least one of; a next sentence of the query, a previous query preceding the query, a next paragraph of the query, a previous paragraph of the query, a next word of the query, a summary of the query, a translation of the query, a paraphrased text of the query, an entity related to the query, a type of the entity, a domain of the query, a numerical value related to the query, a temporal value related to the query, a profile related to the query, a location related to the query, a media file related to the query, an extended query, a query history, a previous answer, an answer history, actions related to an environment, a labelling, and a set of labels.

5. The method of claim 1, further comprising: ranking the determined data objects of the search result embeddings.

6. The method of claim 1, wherein the searching comprises:
combining the set of embeddings resulting in a combined embedding, and
searching, in the data object embeddings, for the subset of data object embeddings that match the combined embedding.

7. The method of claim 1, wherein the searching is performed using a nearest neighbor search for k data object embeddings, where k≥1, for each of the set of embeddings.

8. The method of claim 1, further comprising: for each embedding of the set of embeddings:
computing similarity scores between each embedding and a corresponding search result embedding;
ranking, based on the similarity scores, the determined data objects corresponding to each embedding;
selecting a subset of the determined data objects based on the ranking; and
wherein the at least part of the determined data objects comprises the selected subset.

9. The method of claim 1, wherein the providing comprises:
inputting to a summary generation module determined data objects associated with the search result embeddings of the received query;
receiving from the summary generation module a summary of the determined data objects, the at least part of the determined data objects comprising the summary; and
displaying the summary.

10. The method of claim 1, the trained embedding generation model being a multi-task learning model having as tasks generation of respective embeddings of the query and of each of the one or more task tokens.

11. A computer program product for querying a data source represented by data object embeddings in a vector space, the computer program product comprising:
one or more computer readable storage media and program instructions collectively stored on the one or more computer readable storage media, the stored program instructions comprising program instructions configured for:
receiving a query comprising a data object;
separating the query into one or more query tokens;
identifying one or more task tokens from a pre-defined list of task tokens, wherein the one or more task tokens each represent a prediction of a supplement of the query;
inputting, to a trained embedding generation model, the one or more query tokens and the one or more task tokens for receiving from the trained embedding generation model a set of embeddings of the vector space, the set of embeddings comprising an embedding of the query and an embedding of each of the one or more task tokens;
searching, in the data object embeddings, for a subset of the data object embeddings that match the set of embeddings, resulting in search result embeddings;
determining data objects that are represented by the search result embeddings;
determining additional data objects using, as a new query, a particular data object retrieved for the embedding of a task token of the one or more task tokens; and
providing at least part of the determined data objects and the additional data objects.

12. The computer program product of claim 11, wherein the searching is performed using a nearest neighbor search for k data object embeddings, where k≥1, for each of the set of embeddings.

13. The computer program product of claim 11, wherein the program instructions are configured for:
computing similarity scores between each embedding and a corresponding search result embedding;
ranking, based on the similarity scores, the determined data objects corresponding to each embedding;
selecting a subset of the determined data objects based on the ranking; and
wherein the at least part of the determined data objects comprises the selected subset.

14. The computer program product of claim 11, wherein the program instructions are configured for:
inputting to a summary generation module determined data objects associated with the search result embeddings of the received query;
receiving from the summary generation module a summary of the determined data objects, the at least part of the determined data objects comprising the summary; and
displaying the summary.

15. The computer program product of claim 11, the trained embedding generation model being a multi-task learning model having as tasks generation of respective embeddings of the query and of each of the one or more task tokens.

16. A computer system for querying a data source represented by data object embeddings in a vector space, the computer system comprising:
one or more computer processors;
one or more computer readable storage media;
program instructions collectively stored on the one or more computer readable storage media for execution by at least one of the one or more computer processors, the stored program instructions being configured for:
receiving a query comprising a data object;
separating the query into one or more query tokens;
identifying one or more task tokens from a pre-defined list of task tokens, wherein the one or more task tokens each represent a prediction of a supplement of the query;
inputting, to a trained embedding generation model, the one or more query tokens and the one or more task tokens for receiving from the trained embedding generation model a set of embeddings of the vector space, the set of embeddings comprising an embedding of the query and an embedding of each of the one or more task tokens;

searching, in the data object embeddings, for a subset of the data object embeddings that match the set of embeddings, resulting in search result embeddings;

determining data objects that are represented by the search result embeddings;

determining additional data objects using, as a new query, a particular data object retrieved for the embedding of a task token of the one or more task tokens; and providing at least part of the determined data objects and the additional data objects.

17. The computer system of claim 16, wherein the searching is performed using a nearest neighbor search for k data object embeddings, where k≥1, for each of the set of embeddings.

18. The computer system of claim 16, the computer system comprising: for each embedding of the set of embeddings:

computing similarity scores between each embedding and a corresponding search result embedding;

ranking, based on the similarity scores, the determined data objects corresponding to each embedding;

selecting a subset of the determined data objects based on the ranking; and wherein the at least part of the determined data objects comprises the selected subset.

19. The computer system of claim 16, the computer system comprising:

inputting to a summary generation module determined data objects associated with the search result embeddings of the received query;

receiving from the summary generation module a summary of the determined data objects, the at least part of the determined data objects comprising the summary; and displaying the summary.

20. The computer system of claim 16, the trained embedding generation model being a multi-task learning model having as tasks generation of respective embeddings of the query and of each of the one or more task tokens.

* * * * *